(12) United States Patent
Borinato et al.

(10) Patent No.: US 7,882,900 B2
(45) Date of Patent: Feb. 8, 2011

(54) POWER TOOL WITH SIGNAL GENERATOR

(75) Inventors: Gianni Borinato, Vicenza (IT); Kelvin Wong, Suzhou (CN); Shisong Zhang, Suzhou (CN); Paolo Andriolo, Vicenza (IT); Warren Brown, Mount Evelyn (AU); Hongfeng Zhong, Suzhou (CN); Fangshi Liu, Suzhou (CN); Chengzhong Chen, Suzhou (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 126 days.

(21) Appl. No.: 12/198,712

(22) Filed: Aug. 26, 2008

(65) Prior Publication Data

US 2009/0071673 A1    Mar. 19, 2009

(30) Foreign Application Priority Data

Aug. 29, 2007   (CN) .................. 2007 1 0131762
Jul. 31, 2008    (CN) .................. 2008 1 0145304

(51) Int. Cl.
    *B23B 45/02*    (2006.01)
(52) U.S. Cl. .................. 173/176; 173/216; 173/20; 173/217
(58) Field of Classification Search .................. 173/176, 173/216, 217, 18, 20
    See application file for complete search history.

(56) References Cited

U.S. PATENT DOCUMENTS

| | | | |
|---|---|---|---|
| 3,136,180 A | 6/1964 | Sprague et al. | |
| 3,610,343 A | 10/1971 | Bratt et al. | |
| 3,718,054 A | 2/1973 | Perkins et al. | |
| 3,739,659 A | 6/1973 | Workman | |
| 3,757,605 A | 9/1973 | Morden | |
| 3,821,991 A * | 7/1974 | Alexander | 173/180 |
| 3,834,467 A * | 9/1974 | Fuchs | 173/176 |
| 3,960,035 A | 6/1976 | Workman et al. | |
| 4,040,309 A | 8/1977 | Wood et al. | |
| 4,215,594 A | 8/1980 | Workman et al. | |
| 4,472,984 A | 9/1984 | Cook | |
| 4,484,871 A | 11/1984 | Adman et al. | |
| 4,513,827 A | 4/1985 | Dubiel | |
| 4,641,551 A | 2/1987 | Pascaloff | |
| 4,650,007 A | 3/1987 | Fujita et al. | |
| 4,721,169 A | 1/1988 | Nagasawa et al. | |
| 4,780,785 A | 10/1988 | Schabert et al. | |
| 4,834,192 A | 5/1989 | Hansson | |

(Continued)

FOREIGN PATENT DOCUMENTS

AU    2007 202268    2/2008

(Continued)

*Primary Examiner*—Brian D Nash
(74) *Attorney, Agent, or Firm*—Knobbe, Martens, Olson & Bear LLP

(57) ABSTRACT

A power tool includes a housing, a motor, an output shaft, a gear transmission mechanism and a control system. The gear transmission mechanism is connected between the motor and the output shaft to transmit the rotary power of the motor to the output shaft. The power tool includes a signal generator and a control system electrically coupled to the signal generator and operatively engaged with the gear transmission mechanism such that when the signal generator is manually activated, an electric signal is generated and transmitted to the control system to cause the gear transmission mechanism to vary the gear reduction ratio.

11 Claims, 26 Drawing Sheets

U.S. PATENT DOCUMENTS

| | | |
|---|---|---|
| 4,869,131 A | 9/1989 | Ohmori |
| 4,869,139 A | 9/1989 | Gotman |
| 4,892,013 A | 1/1990 | Satoh |
| 4,898,249 A | 2/1990 | Ohmori |
| 5,014,793 A * | 5/1991 | Germanton et al. ......... 173/181 |
| 5,154,242 A | 10/1992 | Soshin et al. |
| 5,277,261 A * | 1/1994 | Sakoh ........................ 173/176 |
| 5,279,399 A | 1/1994 | Riggle |
| 5,315,501 A * | 5/1994 | Whitehouse ................. 700/32 |
| 5,361,853 A * | 11/1994 | Takamura et al. ........... 173/217 |
| 5,385,512 A * | 1/1995 | Moolenaar et al. .......... 475/153 |
| 5,711,739 A | 1/1998 | Hashimoto et al. |
| 5,967,934 A | 10/1999 | Ishida et al. |
| 6,076,438 A * | 6/2000 | Rahm ........................ 81/473 |
| 6,093,128 A | 7/2000 | Seith et al. |
| 6,165,096 A | 12/2000 | Seith et al. |
| 6,371,218 B1 | 4/2002 | Amano et al. |
| 6,431,289 B1 | 8/2002 | Potter et al. |
| 6,523,442 B2 * | 2/2003 | Lehnert et al. ................ 81/467 |
| 6,758,783 B1 | 7/2004 | Chen |
| 6,814,152 B2 * | 11/2004 | Ginell ........................... 173/2 |
| 6,824,491 B2 | 11/2004 | Chen et al. |
| 6,836,614 B2 * | 12/2004 | Gilmore .................... 388/811 |
| 6,851,343 B2 | 2/2005 | Sasaki |
| 6,971,454 B2 | 12/2005 | Bogue |
| 7,007,762 B2 * | 3/2006 | Yamamoto .................... 173/1 |
| 7,086,483 B2 * | 8/2006 | Arimura et al. ............. 173/217 |
| 7,109,675 B2 * | 9/2006 | Matsunaga et al. .......... 318/433 |
| 7,410,006 B2 | 8/2008 | Zhang et al. |
| 7,410,007 B2 | 8/2008 | Chung et al. |
| 7,681,659 B2 | 3/2010 | Zhang et al. |
| 2003/0089511 A1 * | 5/2003 | Tsuneda et al. ............. 173/217 |
| 2003/0121685 A1 * | 7/2003 | Yamamoto .................. 173/217 |
| 2004/0074652 A1 * | 4/2004 | Ginell ........................... 173/2 |
| 2004/0182588 A1 * | 9/2004 | Tokunaga et al. ............... 173/2 |
| 2004/0192489 A1 | 9/2004 | Chen et al. |
| 2005/0045353 A1 | 3/2005 | Kawai et al. |
| 2006/0021771 A1 | 2/2006 | Milbourne et al. |
| 2006/0118315 A1 | 6/2006 | Suzuki et al. |
| 2007/0034394 A1 * | 2/2007 | Gass et al. ..................... 173/2 |
| 2007/0210733 A1 | 9/2007 | Du et al. |
| 2008/0000333 A1 | 1/2008 | Seno |
| 2008/0032848 A1 | 2/2008 | Ho |
| 2008/0289839 A1 | 11/2008 | Hricko et al. |

FOREIGN PATENT DOCUMENTS

| | | |
|---|---|---|
| CA | 1202707 | 4/1986 |
| CA | 2585676 | 2/2008 |
| CN | 101117999 | 2/2008 |
| EP | 0 787 931 A1 | 8/1997 |
| EP | 1092896 | 4/2001 |
| EP | 1 884 318 | 2/2008 |
| JP | 6-0094278 | 5/1985 |
| JP | 6-2114486 | 5/1987 |
| JP | 3-221381 | 9/1991 |
| JP | 3-221384 | 9/1991 |
| JP | 4-035878 | 2/1992 |
| JP | 4-262151 | 9/1992 |
| JP | 6-008151 | 1/1994 |
| JP | 6-010999 | 1/1994 |
| JP | 6-337047 | 12/1994 |
| JP | 7-145853 | 6/1995 |
| JP | 7-208604 | 8/1995 |
| JP | 7-317850 | 12/1995 |
| JP | 7-317851 | 12/1995 |
| JP | 8-068446 | 3/1996 |
| JP | 8-068461 | 3/1996 |
| JP | 8-296706 | 11/1996 |
| JP | 9-014433 | 1/1997 |
| JP | 9-042388 | 2/1997 |
| JP | 9-042389 | 2/1997 |
| JP | 9-042390 | 2/1997 |
| JP | 9-057639 | 3/1997 |
| JP | 9-057640 | 3/1997 |
| JP | 9-072393 | 3/1997 |
| JP | 9-203419 | 8/1997 |
| JP | 10-103462 | 4/1998 |
| JP | 10-151577 | 6/1998 |
| JP | 11-013839 | 1/1999 |
| JP | 11-090845 | 4/1999 |
| JP | 2000-015586 | 1/2000 |
| JP | 2000-15586 | 1/2000 |
| JP | 2000-354395 | 12/2000 |
| JP | 2003-206960 | 7/2003 |
| JP | 2003-311653 | 11/2003 |
| JP | 2004-314699 | 11/2004 |
| JP | 2005-169535 | 6/2005 |
| JP | 2005-176458 | 6/2005 |
| JP | 2006-000971 | 1/2006 |
| JP | 2006-088305 | 4/2006 |
| JP | 2007-007784 | 1/2007 |
| JP | 2008-068376 | 3/2008 |

* cited by examiner

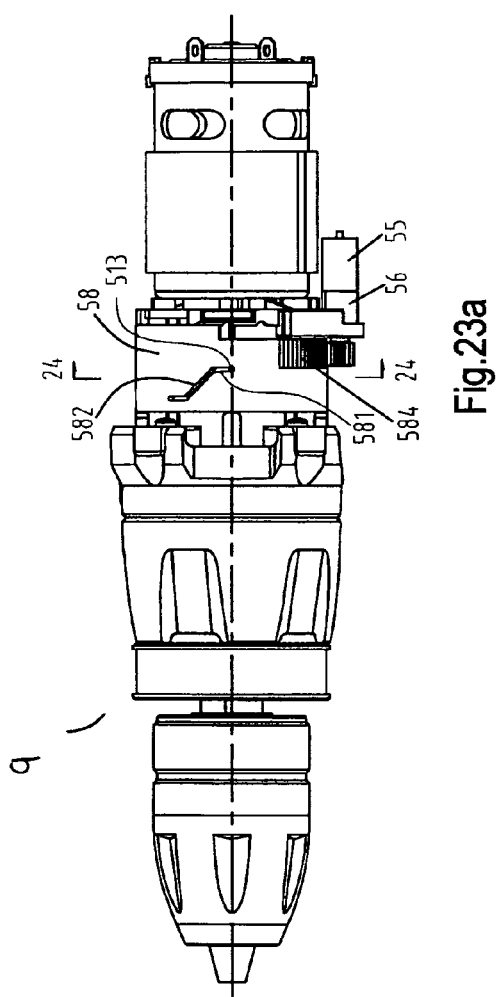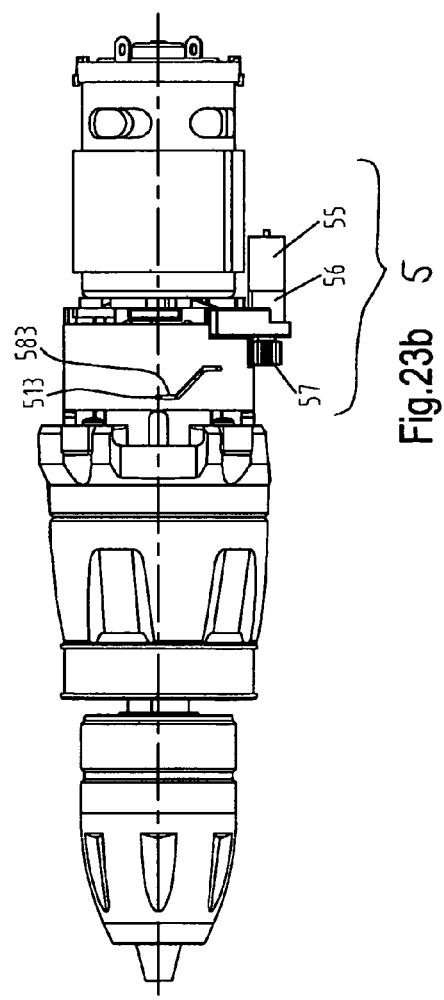

POWER TOOL WITH SIGNAL GENERATOR

RELATED APPLICATIONS

This application claims priority under 35 U.S.C. §119(a)-(d) to Chinese Patent Application No. 200710131762.5, filed Aug. 29, 2007, and Chinese Patent Application No. 200810145304.1, filed Jul. 31, 2008. The contents of these applications are incorporated herein by reference in their entireties.

BACKGROUND OF THE INVENTION

1. Field of the Invention

The present invention relates to a variable speed power tool (such as an electric drill, a screwdriver or an impact drill) having a signal generator which can be selectively activated to perform speed variation.

2. Description of the Related Art

A variable speed power tool (e.g., an electric drill, a screwdriver or an impact drill) usually employs a gear transmission system to selectively output various speeds to adapt to different work conditions. The gear transmission system generally includes a gear transmission mechanism connected between an electric motor and an output shaft and a control system operable by the user to change the gear transmission mechanism so as to vary the gear reduction ratio to output various speeds.

U.S. Pat. No. 6,431,289 discloses a gear transmission mechanism including two ring gears being adjustable forwards and backwards via an actuating member operated by the user outside the housing. By this means, the ring gears can shift between a rotating position where they connect both planet gears and an adjacent planet carrier and a fixed position where they connect to the planet gears and the housing thereby varying the output speed. However by such manual operation, the operator has to monitor the running bit (such as a fastening screw) to decide when to vary the output speed or torque to achieve better output efficiency. This operation is not user-friendly. Furthermore, when the user actuates the actuating member to shift the ring gear from the rotating position to the fixed position, the rotating ring gear is unable to engage a fixed structure in the housing smoothly. In these circumstances, a gear clash between the ring gear and the rotationally fixed structure frequently occurs which results in damage to the ring gear or the fixed structure and may reduce its working life.

U.S. Pat. No. 6,824,491 discloses an automatic variable speed system in which a control system is able to automatically vary the gear reduction ratio by varying the direction of movement of the ring gear according to variation of the torque load. EP-A-0787931 discloses a similar automatic variable speed system. However, these automatic variable speed systems are performed mechanically and the mechanical structure of the systems are complex and difficult to manufacture. Neither system is able to eliminate the occurrence of gear clash.

JP-A-3221381 discloses a solenoid mounted on a motor which is able to actuate linear movement of a switching lever via an actuation lever and a transmitting lever to change the gear reduction ratio of the gear transmission mechanism.

JP-A-4262151 discloses a solenoid adapted to change the gear reduction ratio of the gear transmission mechanism.

JP-A-8068461 discloses a keep solenoid used to drive an internal gear from a high speed position to a low speed position and retain the internal gear at the low speed position. A spring is used to pull the internal gear back to the high speed position.

JP-A-9057639 discloses an auto speed change mode which will not be activated if the motor does not reach the highest output. It is undesirable that auto speed changing is actuated when the trigger switch is being depressed to increase the motor speed. A motor speed detect module is provided to detect motor speed and feed a signal representing motor speed to the control circuit.

JP-A-9057640 discloses a mode selection switch provided to activate or inactivate an automatic speed changing function. The switch is used to select the auto speed change mode and the fixed speed mode. The switch can select between auto mode, high speed mode and low speed mode.

JP-A-10103462 discloses a curve ηh indicating the tool output efficiency at a high speed state. ηl is a curve indicating the tool output efficiency at a low speed state. The tool first works in the high speed state and when the load torque reaches CP, the auto speed change is activated so that the tool then works in the low speed state.

JP-A-9014433 discloses a keep solenoid which is used only to change from high speed to low speed and various means for returning to high speed.

JP-A-1109845 discloses a battery pack voltage detector VP which will detect BP voltage. When the voltage drops below a predetermined value, the auto speed mode is activated directly to vary from high speed to low speed. The activation of auto speed mode is not controlled by control circuit C. The control circuit C detects the load torque by monitoring the motor speed. If the power drops rapidly and the motor speed reduces sharply, the control circuit C cannot activate auto speed changing before the motor has stalled.

SUMMARY OF THE INVENTION

The present invention provides a variable speed power tool having a signal generator which can be activated to perform speed variation as required.

The present invention provides a power tool including a housing, a motor, an output shaft, a gear transmission mechanism and a control system. The gear transmission mechanism is connected between the motor and the output shaft to transmit the rotary power of the motor to the output shaft at a gear reduction ratio. A signal generator is electrically coupled to the control system. When the signal generator is manually activated, an electric signal is generated and transmitted to the control system and in response to the electric signal, the control system causes the gear transmission mechanism to vary the reduction ratio.

In one embodiment, the present invention provides a power tool capable of variable output speed comprising:

a housing;

a motor contained in the housing for outputting rotary power;

an output shaft;

a gear transmission mechanism disposed between the motor and the output shaft for transmission of the rotary power of the motor to the output shaft at each of a plurality of gear reduction ratios;

a signal generator; and a control system electrically coupled to the signal generator and operatively engaged with the gear transmission mechanism such that when the signal generator is manually activated, an electric signal is generated and transmitted to the control system to cause the gear transmission mechanism to vary the gear reduction ratio.

Preferably, the signal generator comprises a switch mounted on the housing.

In a preferred embodiment, the power tool comprises:
a handle coupled to the housing, wherein the handle is arranged at a predetermined distance from the switch such that the switch is operable by the hand of the user without removing the hand from the handle.

Preferably, the control system comprises:
a control unit electrically connected to the switch to receive the electrical signal when the switch is activated and
a driving mechanism actuated by the control unit in response to the electrical signal to cause the gear transmission mechanism to vary the gear reduction ratio.

Preferably, the gear transmission mechanism comprises:
at least one gear train and
a movable member movable between a first position corresponding to a low gear reduction ratio and a second position corresponding to a high gear reduction ratio whereby to vary the gear reduction ratio.

Preferably, the gear train is a planetary gear train which includes a plurality of planet gears, an adjacent planet carrier, and a rotationally fixed structure immovably associated with the housing.

Preferably, the movable member comprises a ring gear which when located at the first position engages the planet gears and the planet carrier and when located at the second position engages the planet gears and the rotationally fixed structure.

Preferably, the driving mechanism is electromagnetically actuatable and operatively engages the movable member, wherein the control unit is operative to apply electric current to the driving mechanism to drive the movable member.

In a particularly preferred embodiment, the electromagnetically actuatable driving mechanism comprises:
a solenoid which includes a coil,
an iron core linearly movable through the coil and
a push bar attached to the iron core and connected to the movable member.

Preferably, the control system comprises an H-bridge circuit for varying the direction of the electric current applied to the electromagnetically actuatable drive mechanism.

Preferably, the control unit is capable of determining whether there is a load applied to the power tool before actuating the driving mechanism.

In a particularly preferred embodiment, the control unit is operative to pause the motor for a first predetermined time interval if there is a load applied and to pause the motor for a second predetermined time interval if there is no load applied, wherein the first predetermined time interval is shorter than the second predetermined time interval.

In a preferred embodiment, the plurality of gear reduction ratios includes a low gear reduction ratio and a high gear reduction ratio and the gear transmission mechanism comprises:
at least one gear train and
a movable member variably engaged with the gear train, wherein the movable member is movable between a first position corresponding to the low gear reduction ratio and a second position corresponding to the high gear reduction ratio, wherein the movable member has a rotational speed at the first position and the control system is operatively associated with the movable member and is capable of determining an operating characteristic indicative of a load applied to the output shaft, wherein the control system is operative to actuate the movable member to move from the first position to the second position and to reduce the rotational speed of the movable member when the operating characteristic reaches or exceeds a predetermined value.

Preferably, the control system is operative to firstly reduce the rotational speed of the movable member and to then actuate the movable member to move from the first position to the second position.

Preferably, the control system is operative to reduce the rotational speed of the movable member to zero.

Preferably, the control unit is capable of determining the operating characteristic indicative of a load applied to the output shaft and reducing the rotational speed of the movable member.

Preferably, the power tool further comprises a driving mechanism actuatable by the control unit to drive the movable member between the first position and the second position.

The driving mechanism may be, or comprise, a small motor, a linear motor, a servo motor or a piezoelectric motor to assist in performing automatic speed variation.

In a particularly preferred embodiment, the driving mechanism is electromagnetically actuatable and operatively engages the movable member, wherein the control unit is operative to apply electric current to the driving mechanism to drive the movable member.

In a particularly preferred embodiment, the driving mechanism comprises:
a solenoid which includes a coil, an iron core linearly movable through the coil and a push bar attached to the iron core and connected to the movable member.

The operating characteristic may be an electrical parameter (such as electric current or voltage of the motor), rotational speed or torque of the motor or output shaft or stress of the mechanical components.

In a preferred embodiment, the operating characteristic is the motor current.

In a further embodiment, the present invention provides a power tool for varying output speed, comprising:
a housing,
a motor contained in the housing for outputting rotary power;
an output shaft;
a gear transmission mechanism disposed between the motor and the output shaft for transmission of the rotary power of the motor to the output shaft at each of a plurality of gear reduction ratios including a first gear reduction ratio and a second gear reduction ratio, the gear transmission mechanism comprising
at least one gear train and
a movable member variably engaged with the gear train, wherein the movable member is movable between a first position corresponding to the first gear reduction ratio and a second position corresponding to the second gear reduction ratio; and
a control system comprising a mechanism for driving the movable member to move from the first position to the second position and from the second position to the first position.

Preferably, the mechanism comprises a bi-directional keep solenoid capable of retaining the movable member at the first or the second position without electricity.

In a particularly preferred embodiment, the bi-directional keep solenoid comprises a push bar connected to the movable member.

In a particularly preferred embodiment, the bi-directional keep solenoid further comprises:
a longitudinal metallic shell,
a pair of coils arranged longitudinally in the shell, a permanent magnet disposed between the pair of coils and an iron core linearly movable through the pair of coils, wherein the push bar is fixed to the iron core.

Preferably, the gear train is a planetary gear train which includes a plurality of planet gears, an adjacent planet carrier, and a rotationally fixed structure immovably associated with the housing.

Preferably, the movable member comprises:

a ring gear which when located at the first position engages the planet gears and the planet carrier and when located at the second position engages the planet gears and the rotationally fixed structure.

Preferably, the control system further comprises:

a control unit operative to apply electric current to the mechanism to drive the movable member.

Preferably, the control system comprises an H-bridge circuit for changing the direction of the electric current applied to the mechanism.

The power supply may be a DC power supply (preferably a rechargeable battery pack). The battery pack may be composed of a number of serially connected cells. The cells can rely on any cell chemistry such as for example lead-acid, Nickel-cadmium ("NiCd"), Nickel-Metal Hydride ("NiMH") or Lithium-based chemistry such as Lithium-cobalt ("Li—Co") or Lithium-manganese ("Li—Mn"). The battery pack may have a nominal voltage such as 14.4V, 18V or 21V dependent on the number of cells.

BRIEF DESCRIPTION OF THE DRAWINGS

The above and other objects, features and advantages of the invention will become more apparent from the following description of embodiments in conjunction with the accompanying drawings in which:

FIG. 4b is a partial enlarged view of the driving mechanism of the power tool of FIG. 4a;

FIGS. 23a and 23b shows a power tool of a seventh embodiment of the present invention and its driving mechanism at high speed and low speed respectively; and FIG. 24 is a partial cross-sectional view of the power tool taken along the line 24-24 of FIG. 23a.

DETAILED DESCRIPTION OF THE INVENTION

Figure 1:
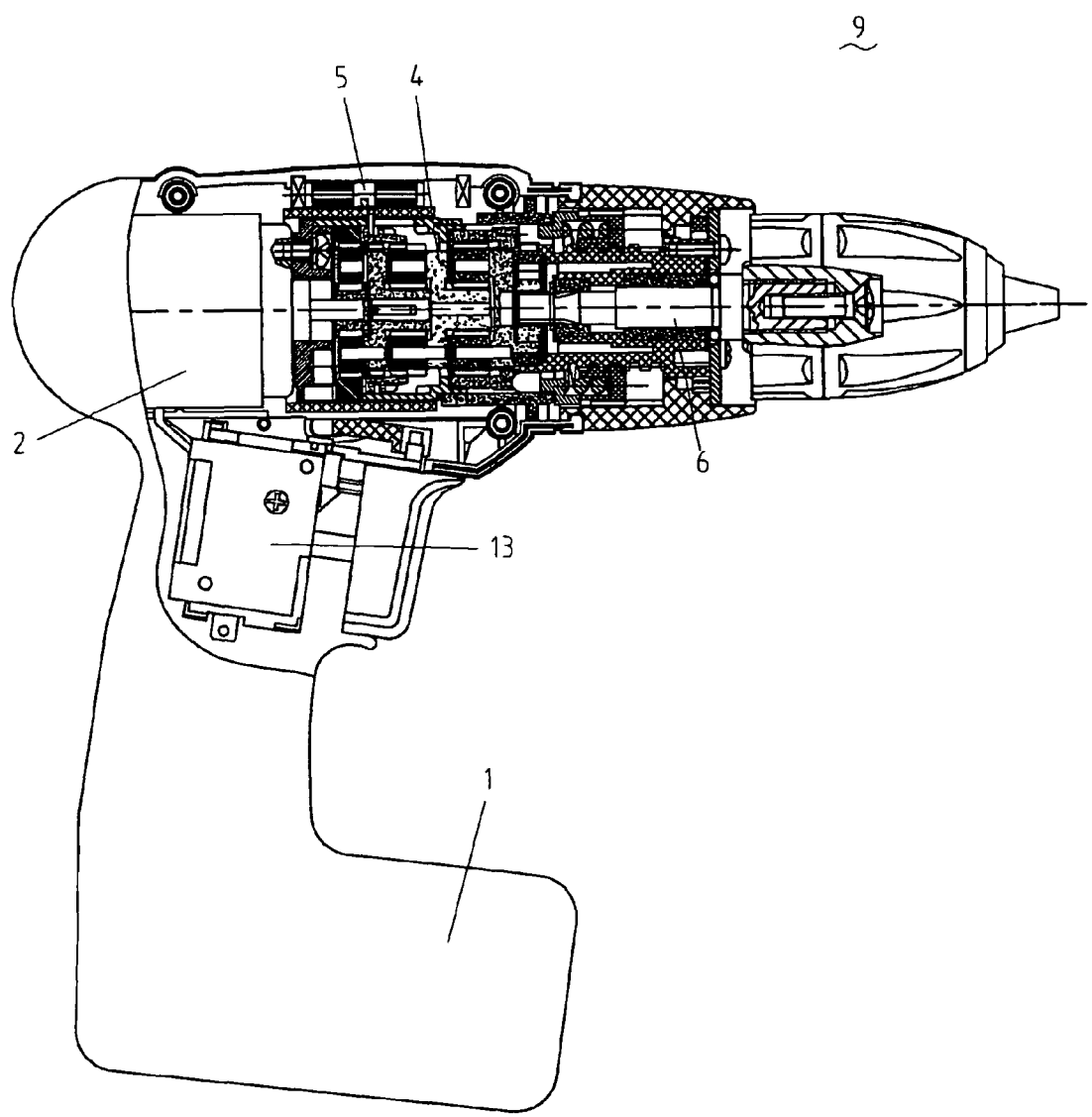
FIG. 1 is an elevational side view of a variable speed power tool of a first embodiment of the present invention, wherein the housing of the power tool is partially cutaway to show a gear transmission mechanism.
Figure 2:
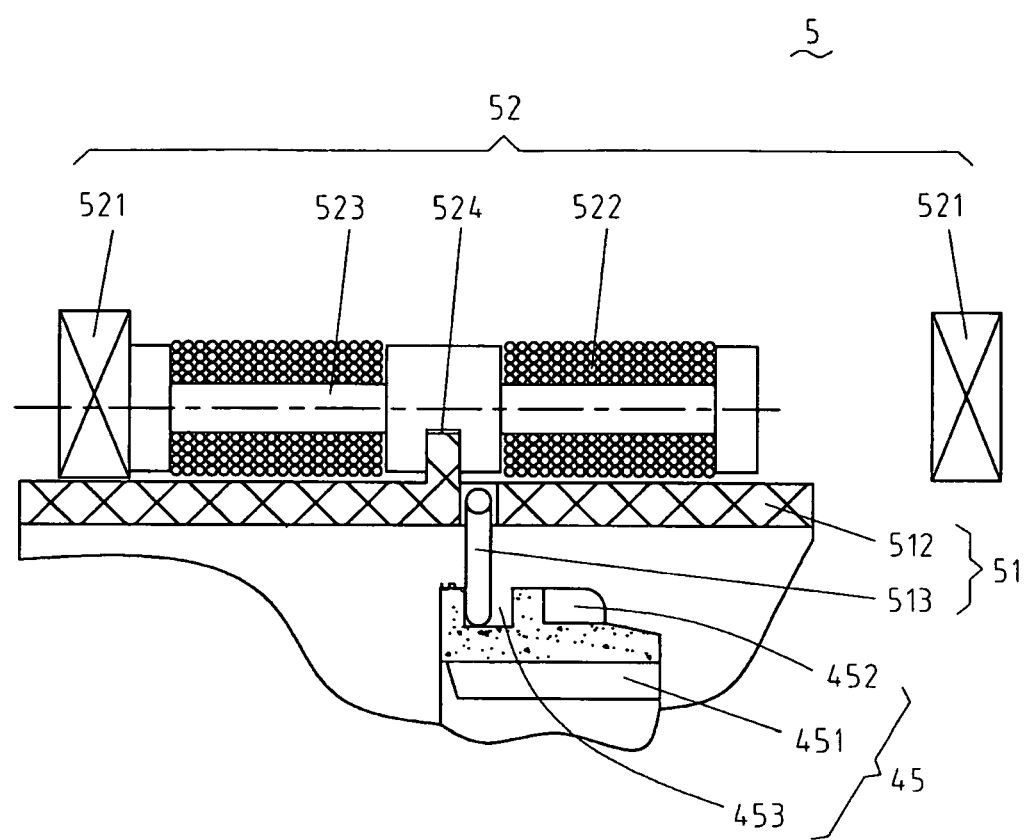
FIG. 2 is a partial enlarged view of the driving mechanism of the power tool of FIG. 1.

FIGS. 1 to 3b show a variable speed power tool in accordance with a first embodiment of the present invention. The power tool 9 includes an electric motor 2, a power supply 1, a main switch 13 for starting or stopping the motor 2, an output shaft 6 and a gear transmission mechanism 4. The gear transmission mechanism 4 includes a first planetary gear train including a plurality of first planet gears 40 and a first planet carrier 41, a second planetary gear train including a plurality of second planet gears 42 and a second planet carrier 43, a rotationally fixed structure 44 fixed inside a housing 21 and an axially movable member 45. A driving mechanism 5 engages the gear transmission mechanism 4 and includes an actuating device 52 and a transmission member 51.

In the first embodiment, the actuating device 52 is electromagnetic and includes a pair of spaced apart permanent magnets 521, an iron core 523 located between the permanent magnets 521 and a coil 522 around the iron core 523. In the middle of the iron core 523 is defined a groove 524. The transmission member 51 includes an arc-shaped push bar 512 and a steel wire 513 engaged with the push bar 512. The push bar 512 has an engaging portion which is capable of projecting into the groove 524 of the iron core 523. In this embodiment, the movable member 45 is a ring gear having internal teeth 451 and side teeth 452. The movable member 45 defines an annular groove 453 for accommodating the steel wire 513.

When electric current flows through the actuating device 52, the iron core 523 is magnetized and attracted by one of the permanent magnets 521. When the direction of electric current is reversed, the iron core 523 is attracted by and moved to the other of the permanent magnets 521 and the push bar 512, steel wire 513 and movable member 45 are actuated to move along with the iron core 523.

Figure 3A:
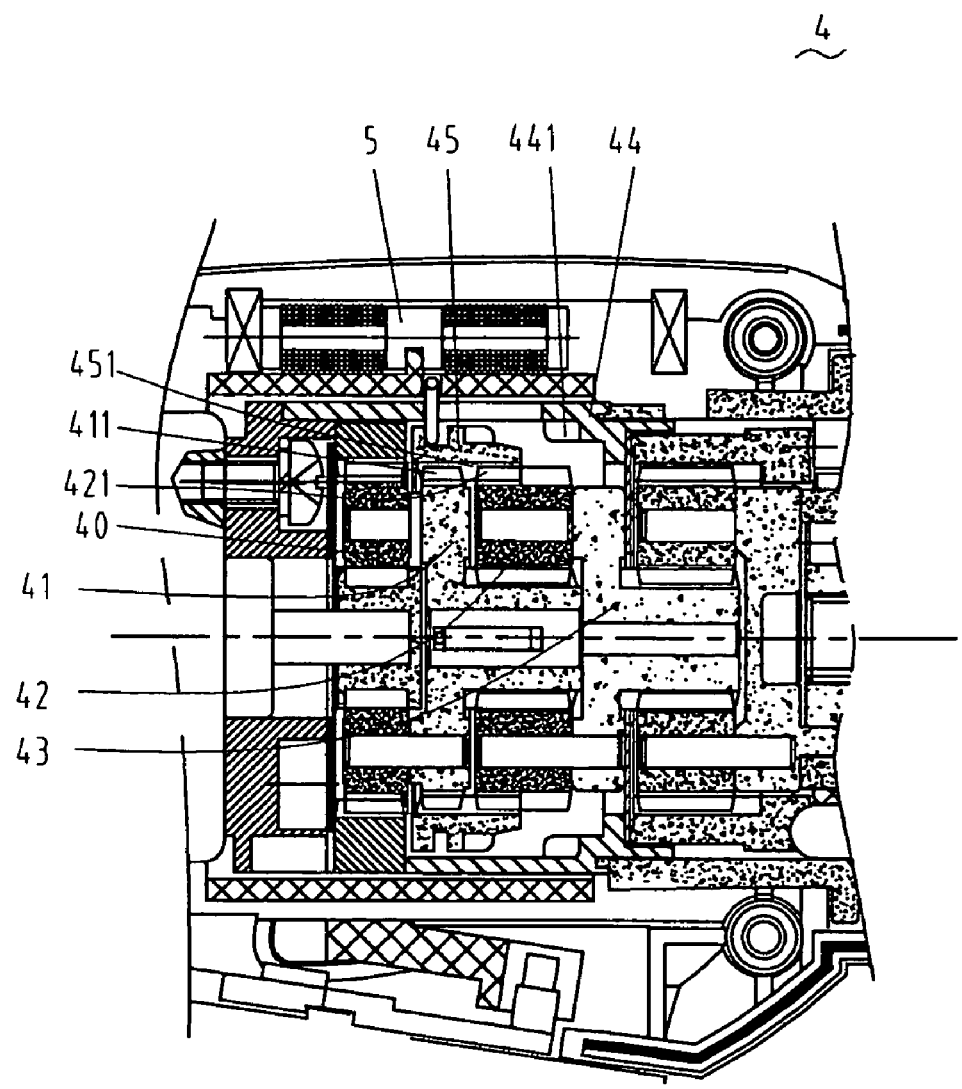
FIG. 3a is a partial enlarged view of the gear transmission mechanism of the power tool of FIG. 1 in a high speed state.

FIG. 3a shows the gear transmission mechanism 4 in a high speed position in which the iron core 523 is attracted by one of the permanent magnets 521. Accordingly the internal teeth 451 of the movable member 45 mesh with external teeth 411, 421 of the first planet carrier 41 and the second planet gears 42. By this engagement, the gear transmission mechanism 4 has a relatively low gear reduction ratio and the output shaft 6 attains a relatively high speed.

Figure 3B:
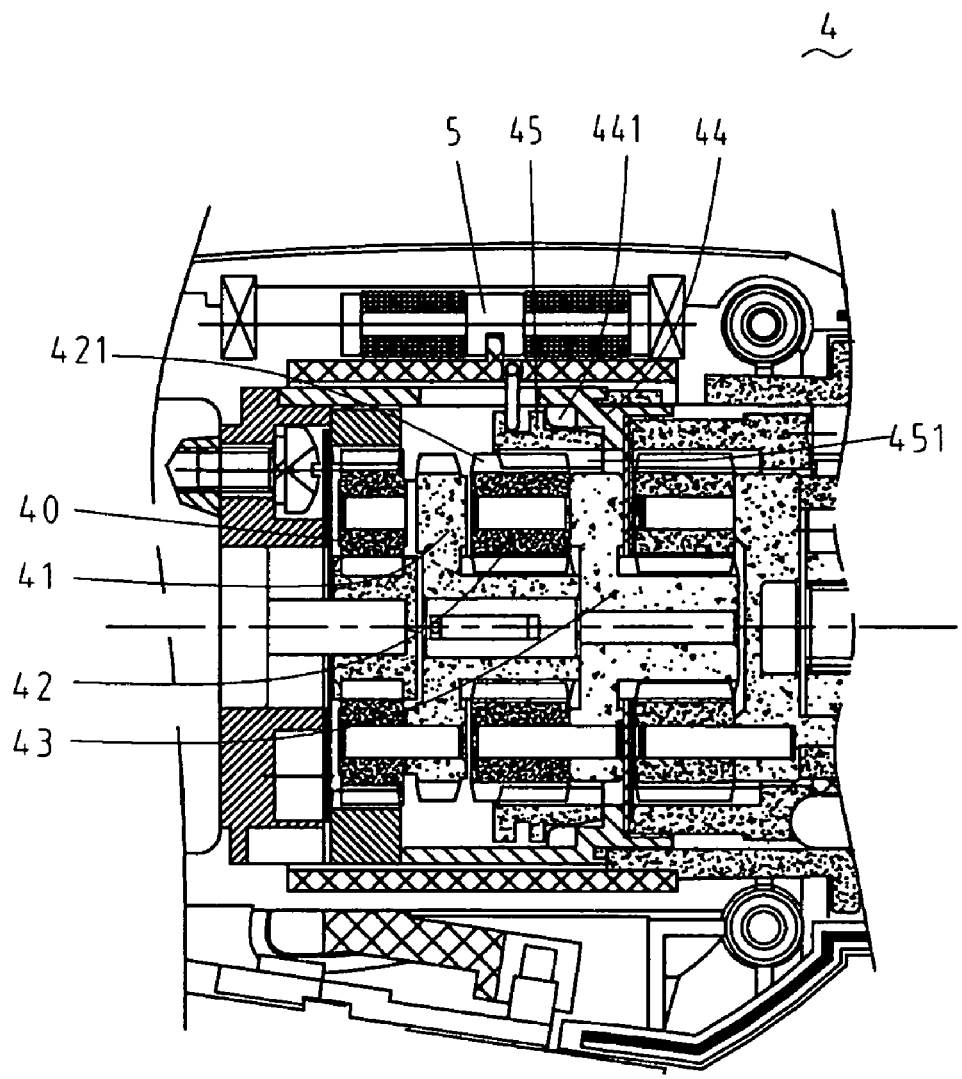
FIG. 3b is a partial enlarged view of the gear transmission mechanism of the power tool of FIG. 1 in a low speed state.

FIG. 3b shows the gear transmission mechanism 4 in a low speed position in which the iron core 523 is attracted by the other of the two permanent magnets 521. Accordingly the internal teeth 451 of the movable member 45 mesh with the external teeth 421 of the second planet gears 42 only. Meanwhile, the side teeth 452 of the movable member 45 mesh with the teeth 441 of the rotationally fixed structure 44 to be fixed with respect to the housing. By this engagement, the gear transmission mechanism 4 has a relatively high gear reduction ratio and the output shaft 6 attains a relatively low speed.

Figure 4A:
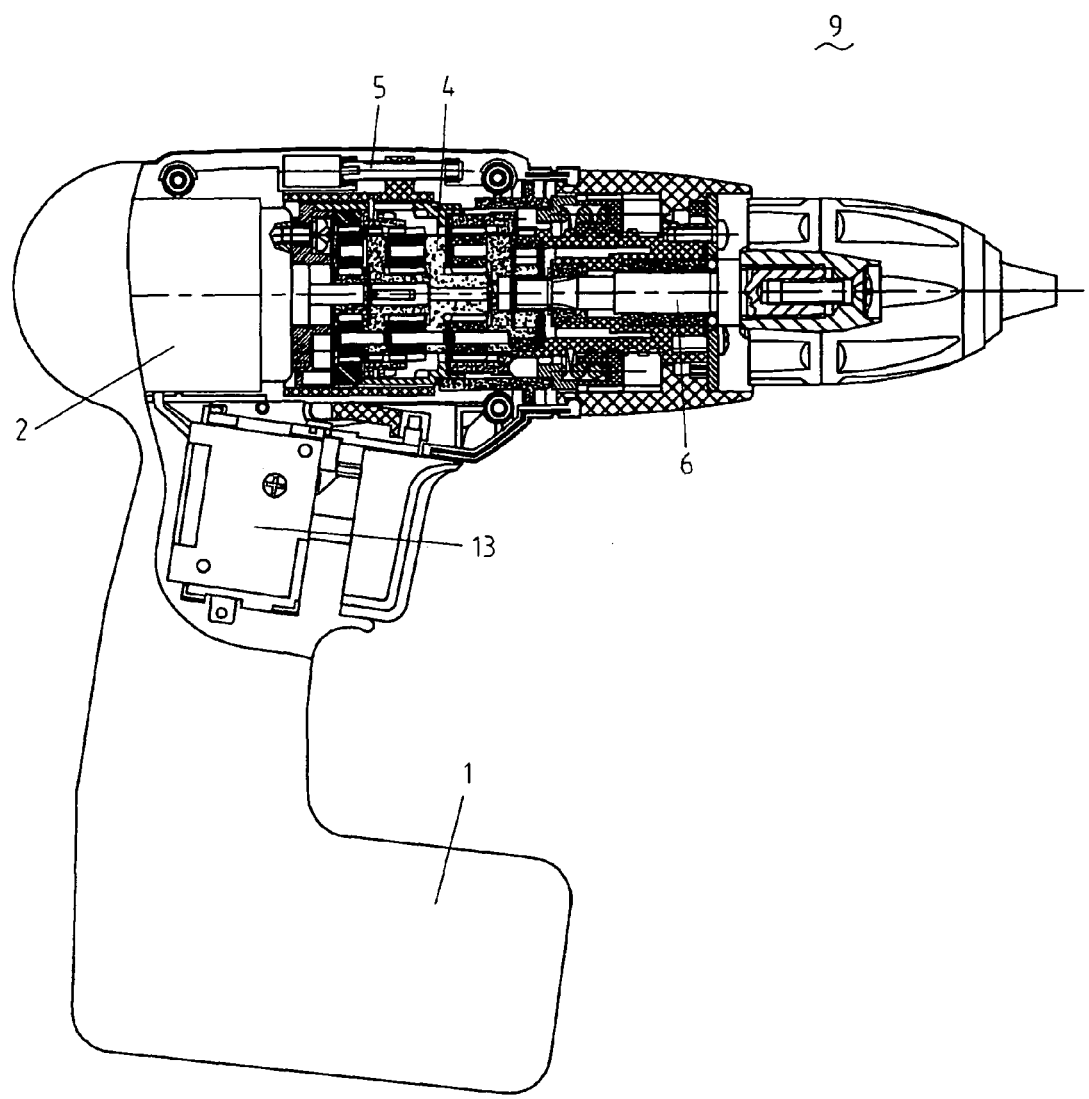
FIG. 4a is an elevational side view of a variable speed power tool of a second embodiment of the present invention, wherein the housing of the power tool is partially cutaway to show a gear transmission mechanism.
Figure 4B:
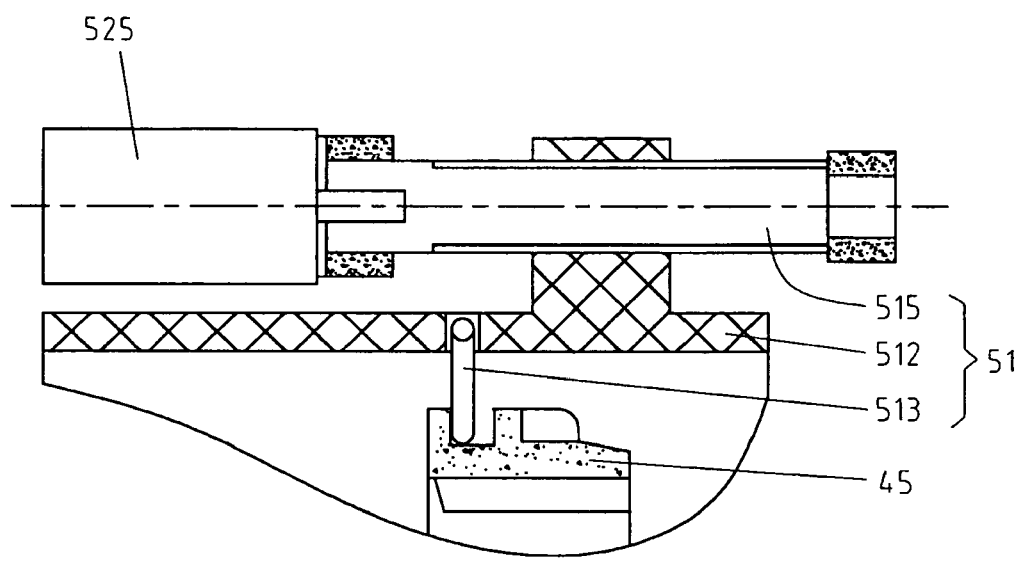

FIGS. 4a and 4b show a second embodiment of a power tool 9 of the invention and its driving mechanism 5. The driving mechanism 5 is electromagnetic. When electric current flows, the movable member 45 is actuated to move between a high speed position and a low speed position. In this second embodiment, the actuating device 52 is a servo motor 525 and the transmission member 51 includes a screw member 515, a push bar 512 with inner threads engaging the screw member 515 and a steel wire 513. The servo motor is 525 able to rotate in a forward direction and a reverse direction to actuate the push bar 512 together with the movable member 45 to move along the screw member 515 between the high speed position and the low speed position.

Figure 5:
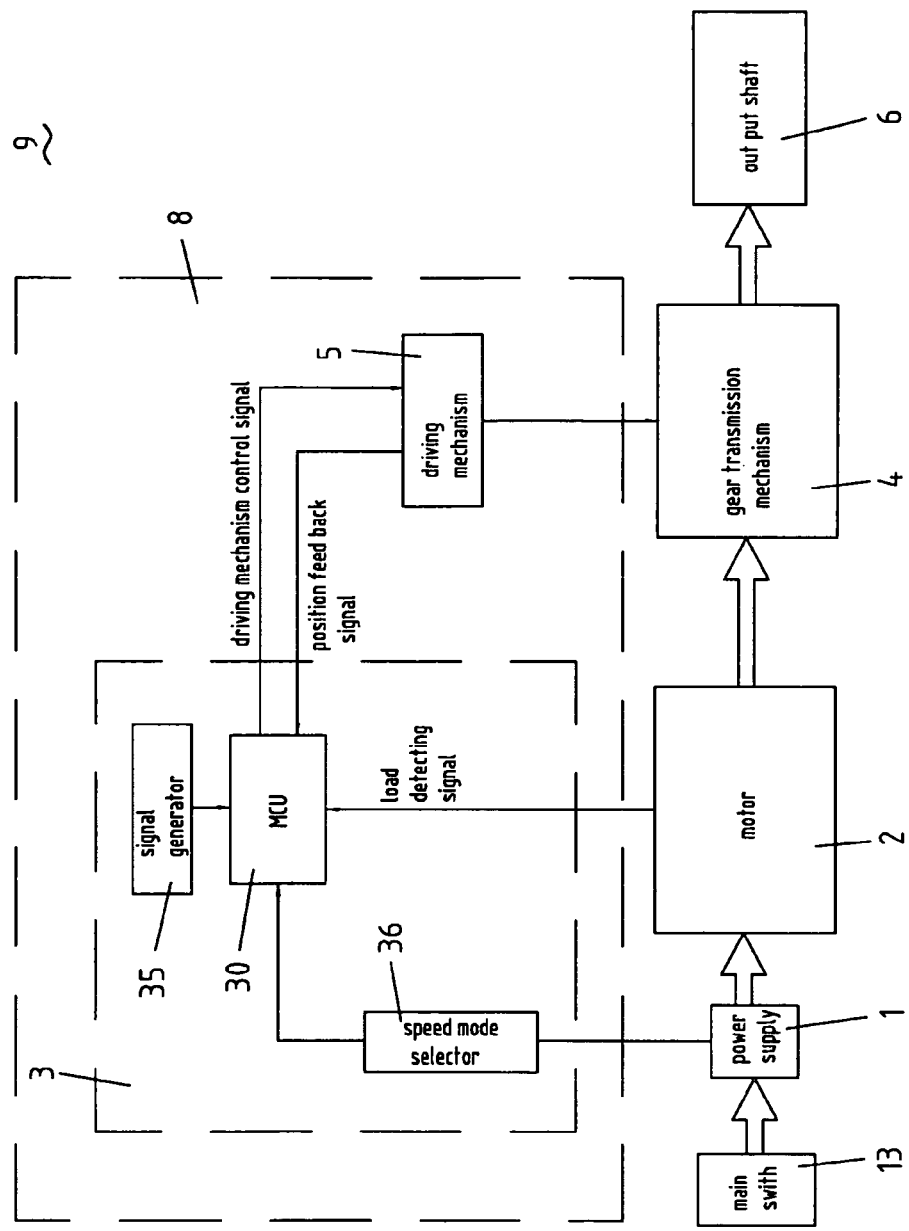
FIG. 5 is a block diagram of a first electronic control system for controlling the gear transmission mechanism.

FIG. 5 is a block diagram of a first electronic control system 8 of the power tool 9 of the invention. The electronic control system 8 includes an electronic control unit 3 and the driving mechanism 5. The electronic control unit 3 includes a microcontroller (MCU) 30 and an input/output circuit. A signal generator 35 is connected to the microcontroller 30. A speed mode selector 36 is connected between the microcontroller 30 and the power supply 1. The driving mechanism 5 is controlled by the microcontroller 30 to perform automatic speed variation. After completing speed variation, the movable member 45 arrives at the high or low speed position as required. In the meantime, the microcontroller 30 receives a position feedback signal indicating the current position of the movable member 45. The operator can selectively activate or inactivate the function of automatic speed variation by operating the speed mode selector 36. The form of the speed mode selector will be described in more detail hereinafter with reference to FIGS. 16 and 18.

In auto mode, the microcontroller 30 determines an operating characteristic of the power tool 9 and compares it with a predetermined value to then determine whether to activate automatic speed variation. It will be apparent to those skilled in the art that an operational amplifier circuit may be used in place of the microcontroller 30 to perform the comparison step. The operating characteristic may be an electrical parameter (such as electric current or voltage of the motor), rotational speed or torque of the motor or output shaft or stress of the mechanical components.

In some circumstances, even in the auto mode, the operator may wish to self-determine the speed variation whilst the power is still running. In this case, the operator can input a control signal to the microcontroller 30 via a signal generator 35. In response to the control signal, the microcontroller 30 performs the operation for speed variation immediately.

During the course of automatic speed variation, the electronic control unit 3 may issue a control signal to actuate the driving mechanism 5. The actuating device 52 of the driving mechanism 5 then shifts the transmission member 51 along with the movable member 45 from the high speed position to the low speed position. During this period, the movable member 45 (the ring gear in this embodiment) is required to change from a rotational running state to a standing state so that it is able to mesh with the fixed structure smoothly. Otherwise, a gear clash between the movable member 45 and the rotationally fixed structure 44 occurs. In order to avoid gear clash, one of three electronic control units discussed in detail below may be deployed.

Figure 6:
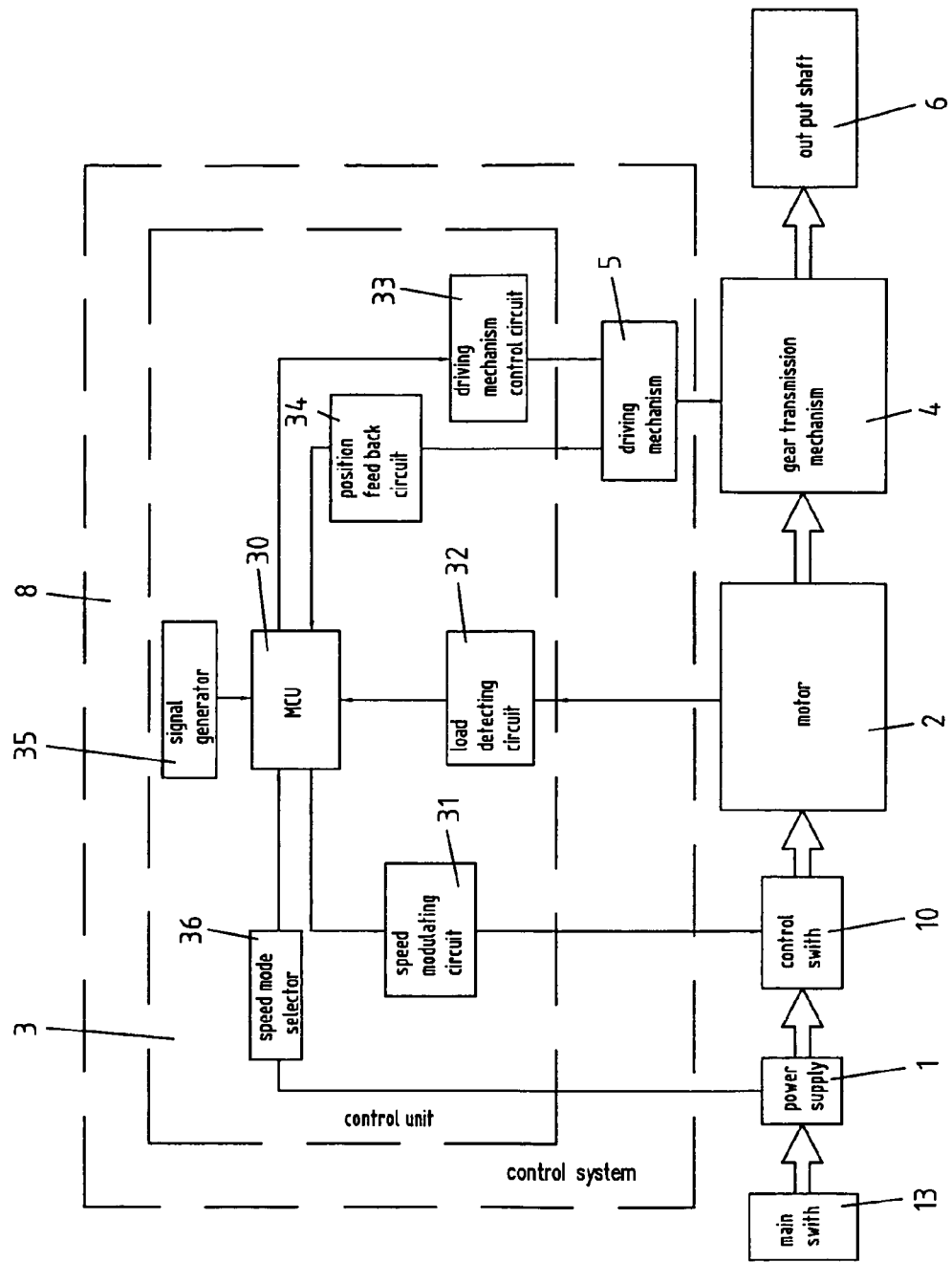
FIG. 6 is a block diagram of a second electronic control system for controlling the gear transmission mechanism which further includes a power switch.

FIG. 6 shows a block diagram of a second electronic control system 8 comprising the electronic control unit 3 and the driving mechanism 5. The control unit 3 includes the microcontroller 30, a speed modulating circuit 31, a load detecting circuit 32, a driving mechanism control unit 33 and a position feedback circuit 34. A power switch 10 such as MOSFET, triac or relay is connected between the power supply 1 and the motor 2. The power switch 10 is controlled by the speed modulating circuit 31.

At start-up of the power tool 9, the microcontroller 30 closes the power switch 10 after a predetermined delay (for example 0.1 seconds). In the period of delay, the microcontroller 30 sends an instruction signal to the driving mechanism control circuit 33 for resetting the driving mechanism 5 to the high speed position. The power supply 1 then powers on the motor 2 and at this time, the output shaft 6 begins to drive a tool bit (not shown) applied to a work piece (not shown). The load detecting circuit 32 samples the electric current flowing through the motor 2 in real time. The microcontroller 30 then compares the current value with a predetermined value. If the current value is larger than the predetermined value for a predetermined time period, the power tool 9 is overloaded and it is required to switch the output speed to a relatively low state. The microcontroller 30 then sends an instruction signal to the speed modulating circuit 31 to control the power switch 10 to cut off the power supply to the motor 2 thereby reducing the rotational speed of the motor 2 to zero. The rotational speed of the ring gear 45 is also reduced to zero. The microcontroller 30 then issues an instruction signal to the driving mechanism control circuit 33 to reverse the electric current. After the current has reversed, the iron core 523 along with the movable member 45 is moved from the high speed position to the low speed position. Since the rotation of the movable member 45 has been reduced to zero before starting to move, the movable member 45 is capable of engaging the rotationally fixed structure smoothly and does not cause gear clash.

After the iron core 523 reaches the other of the permanent magnets 521, the position feedback circuit 34 of the electronic control unit 3 receives a position signal indicating the present position of the iron core 523 and the movable member 45 and passes the signal to the microcontroller 30. It will be apparent to a person skilled in the art that the position signal may be issued by detecting the position of the movable member 45. The microcontroller 30 then sends an instruction signal to the speed modulating circuit 31 to turn on the power switch 10 and the power supply 1 provides power to the motor 2. Thus the motor outputs a low speed and large torque.

When the variable power tool 9 works at high speed, the motor current may suddenly increase due to troublesome operation. The cause of this may be an irregularity of the threaded groove on the bolt or a slight warp of a member interleaved between the bolt and the nut or clipping of dust between the bolt and the nut. There is a risk that the automatic speed variation is undesirably actuated due to the current momentarily exceeding a predetermined threshold value. To avoid this possibility, the comparison of the sampled current with the threshold value lasts for a predetermined time period (eg 0.5 seconds), Only when the sampled current remains larger than the predetermined threshold value beyond the time period will the automatic speed variation be actuated.

The operator can deploy the speed mode selector to select a manual mode to vary the output speed. The preset threshold value is determined on the upper current value when the power tool is the high speed state. In the present embodiment, the preset threshold value is 30A. If the operator wishes to initiate automatic speed variation before the motor current value reaches the predetermined threshold value, a control signal to the microcontroller 30 can be inputted via the signal generator 35. The microcontroller 30 then initiates speed variation immediately. Alternatively, the preset threshold value may be determined by a number of historical values that the operator has inputted previously. In other words, the electronic control unit 3 is able to "learn" itself. To achieve this, the electronic control unit 3 may store the values of the motor current at the time when the operator inputs the control signal to activate the speed variation and the control unit may set the mean of the stored values as the threshold value.

In the above mentioned embodiment, the microcontroller 30 stops the motor 2 before the movable member 45 meshes with the rotationally fixed structure so as to avoid gear clash. However if the rotational speed of the motor 2 reduces to a relatively low level, gear clash can still be avoided when the movable member 45 meshes with the rotationally fixed structure 44.

Figure 7:
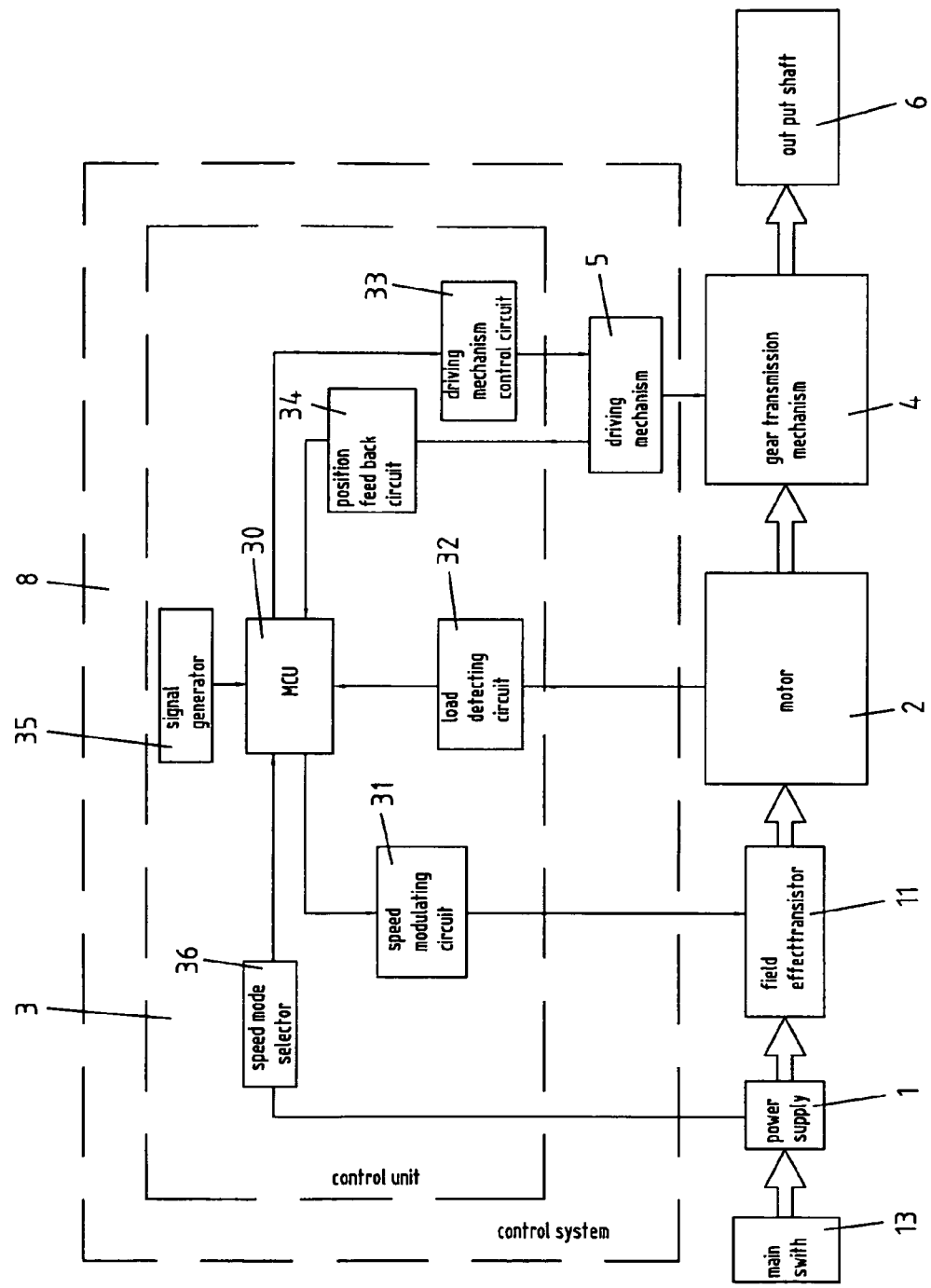
FIG. 7 is a block diagram of a third electronic control system for controlling the gear transmission mechanism which further includes a field effect transistor.

FIG. 7 shows a third electronic control system comprising the electronic control unit 3 and the driving mechanism 5. In the main circuit, the power switch 10 is replaced by a field effect transistor 11 (for example a MOSFET). When automatic speed variation is activated, the speed modulating circuit 31 controls the field effect transistor 11 to reduce the rotational speed of the motor 2 so that the movable member 45 has a speed reduced to a relatively low level such that no gear clash occurs when it meshes with the rotationally fixed structure 44.

Figure 8:
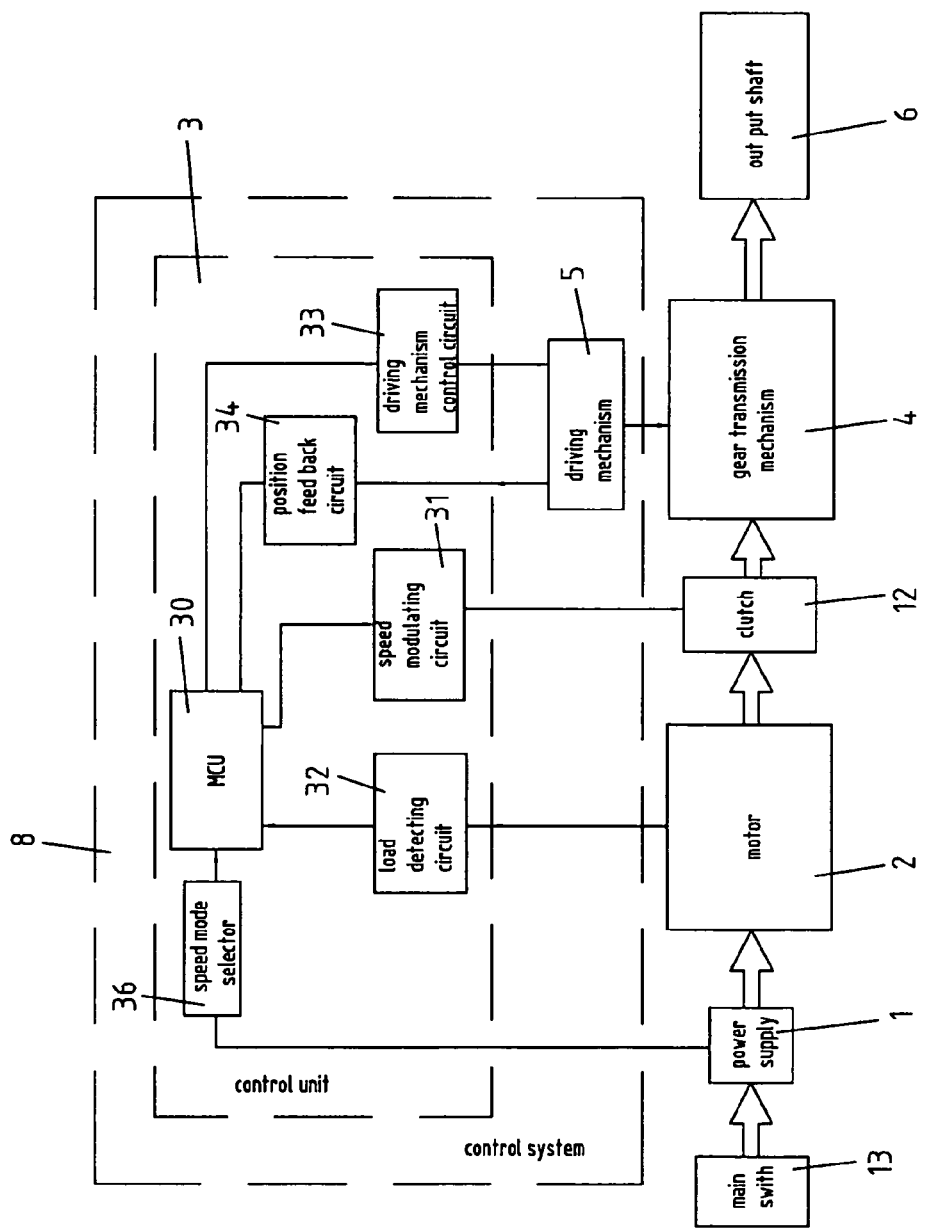
FIG. 8 is a block diagram of a fourth electronic control system for controlling the gear transmission mechanism which further includes a clutch.

FIG. 8 is a block diagram of a fourth electronic control system comprising the electronic control unit 3 and the driving mechanism 5. A clutch mechanism 12 is provided between the motor 2 and the gear transmission mechanism 4. Similar to the third electronic control system, the speed modulating circuit 31 controls the clutch mechanism 4 to reduce the torque transmitted from the motor 2 to the gear transmission mechanism 4 thereby reducing the rotational speed of the movable member 45 to a relatively low level before the movable member 45 engages the rotationally fixed structure. As described hereinbefore, the electronic control unit 3 detects whether the load applied to the power tool 9 exceeds the predetermined threshold value after a predetermined time period and then if necessary, modulates the speed of the movable member 45 or gear transmission mechanism 4 via the speed modulating circuit 31. When the rotational speed of the movable member 45 is sufficiently low, the driving mechanism 5 is activated to automatically perform speed variation without gear clash.

After automatic speed variation is complete, the power supply to the motor 2 is resumed. If the rotational speed of the motor increases from zero to a normal value instantly, a large torque will be generated which may result in slippage of the tool from the hands of the operator. This can be avoided by using the field effect transistor 11 to soft start the motor 2. Specifically, a time interval of typically 0.6 s exists between the motor 2 beginning to rotate and the motor 2 working at a normal working state. During the interval, the electronic control unit 3 controls the field effect transistor 11 by varying a pulse width modulating signal (for example by adjusting the pulse width in a fixed frequency or adjusting the pulse frequency in a fixed width) in such a manner as to step up the voltage applied to the motor 2 to the normal working state. This lessens the impact on the operator.

Figure 9:
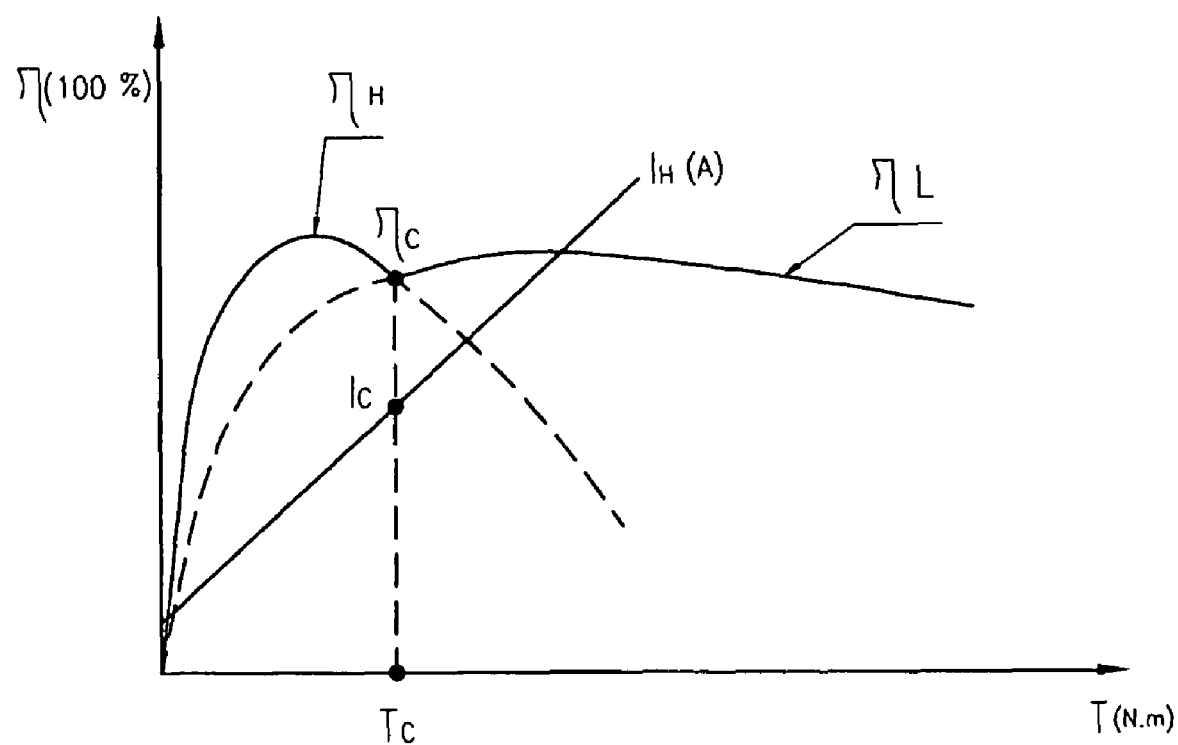
FIG. 9 is a graph of the output efficiency η of the power tool versus the torque load T applied to the power tool to illustrate the timing of switching from high speed to low speed.

An alternative timing for switching the output speed of the power tool will be described with reference to FIG. 9. FIG. 9 is a graph of the output efficiency of a power tool versus the torque load T applied to the output shaft. The output efficiency of the power tool is the ratio of the output power of the output shaft to the input power of the motor. Curve ηH represents the output efficiency of the tool running at high speed and curve ηL represents the output efficiency of the tool running at low speed. As shown in FIG. 9, before the torque load value reaches Tc, the value of the output efficiency of the tool at high speed is higher than that at low speed. When the torque load value exceeds Tc, the value of the output efficiency of the tool at high speed will be lower than that at low speed. Therefore to ensure that the power tool always performs at a high output efficiency, it is supposed that the power tool runs at high speed before the torque load value reaches Tc and the power tool turns to run at low speed after the torque load value exceeds Tc. In other words, the best time for switching the speed from high to low is when the torque load value equals Tc.

The current flowing through the motor running at high speed is employed as an operating characteristic of the power tool to indicate the load applied to the output shaft. Referring to FIG. 9, the current curve IH may rise linearly as the torque load T increases. When the torque load reaches Tc, the curve ηH intersects the curve 1L at the transition point ηC and the motor current increases to a switching point Ic. In the present embodiment the value of Ic is 30 A. A person skilled in the art will recognize that a resistor (383 in FIG. 20) may be connected in series with the motor to act as a current sensor. A microcontroller (30 in FIG. 20) may connect to the current sensor to monitor the motor current. When the microcontroller detects that the motor current reaches Ic, it executes an algorithm to automatically switch from high speed to low speed. The operation of the microcontroller will be described in greater detail hereinafter in connection with FIG. 21. It will be noted that the motor current curve may be different for various types of motor but generally the rise of the curve may be linear or substantially linear. The present embodiment employs the motor current to represent the load applied to the output shaft. As stated in previous embodiments, a person skilled in the art will recognize that a variety of operating characteristics of the power tool can provide the same effect (such as the torque or speed of the output shaft, the speed of the motor and the torque or speed of gears of the gear transmission mechanism). When using a battery pack for power supply, voltage variation to the contacts of the battery pack may also be used to represent the applied load.

Figure 10:
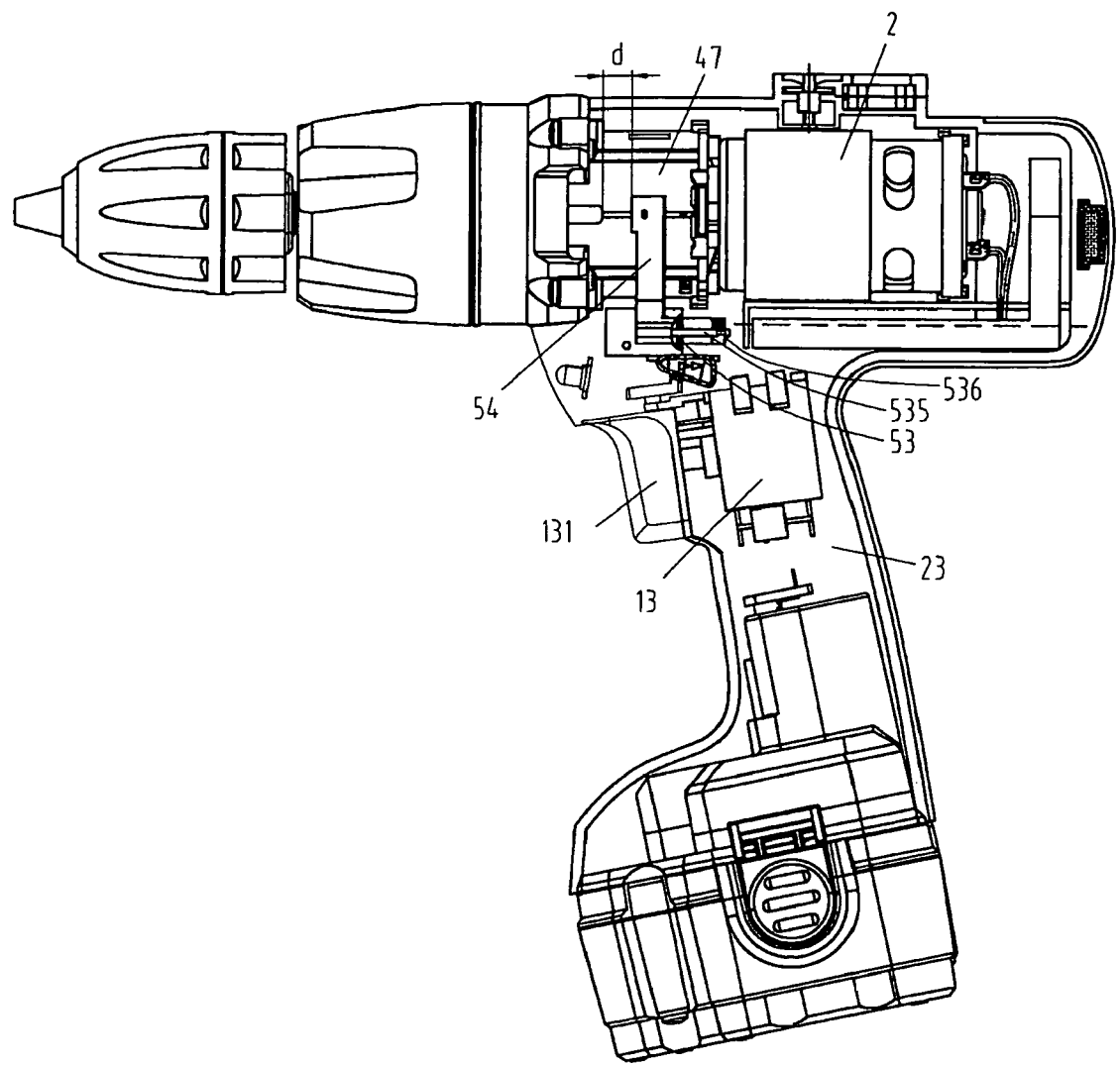
FIG. 10 illustrates an elevational side view of a variable speed power tool of a third embodiment of the present invention with a driving mechanism in a high speed state.
Figure 11:
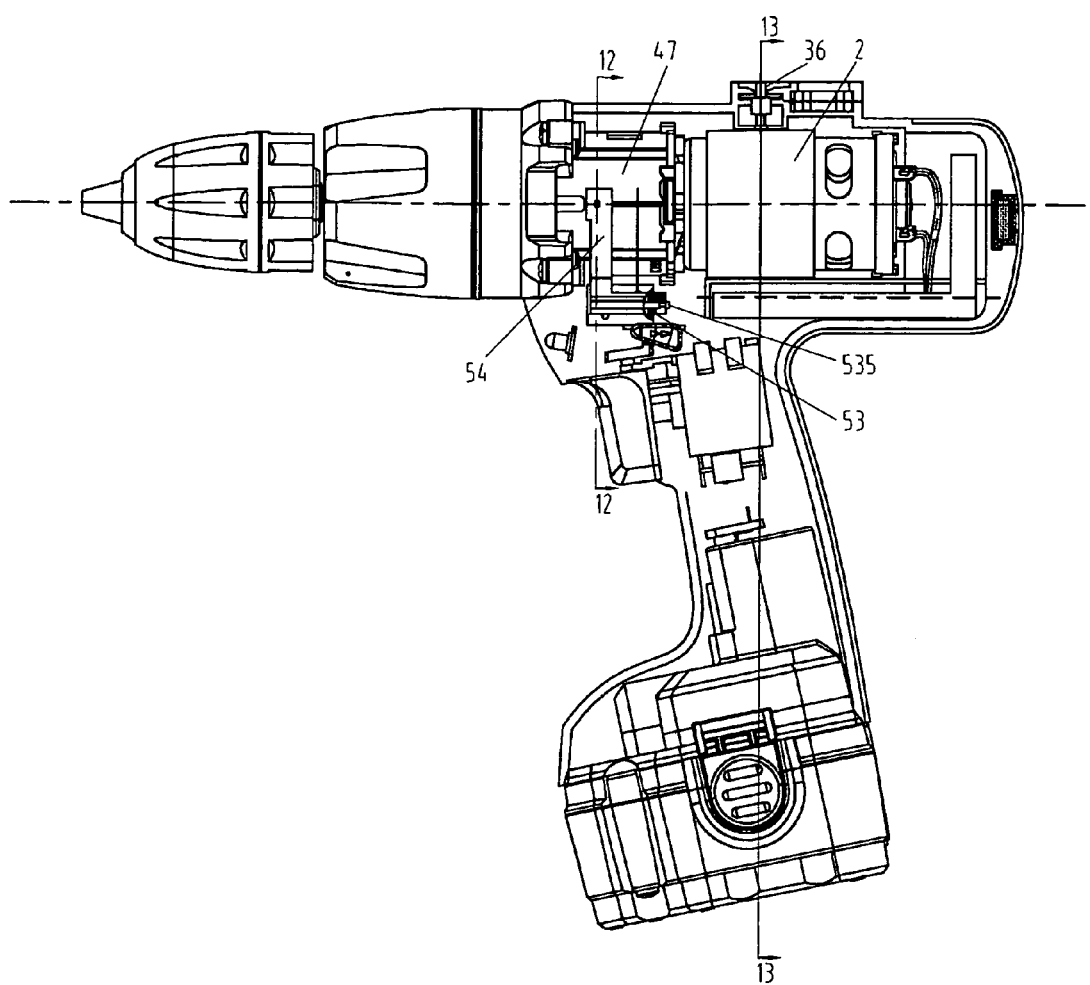
FIG. 11 illustrates the driving mechanism of FIG. 10 in a low speed state.
Figure 12:
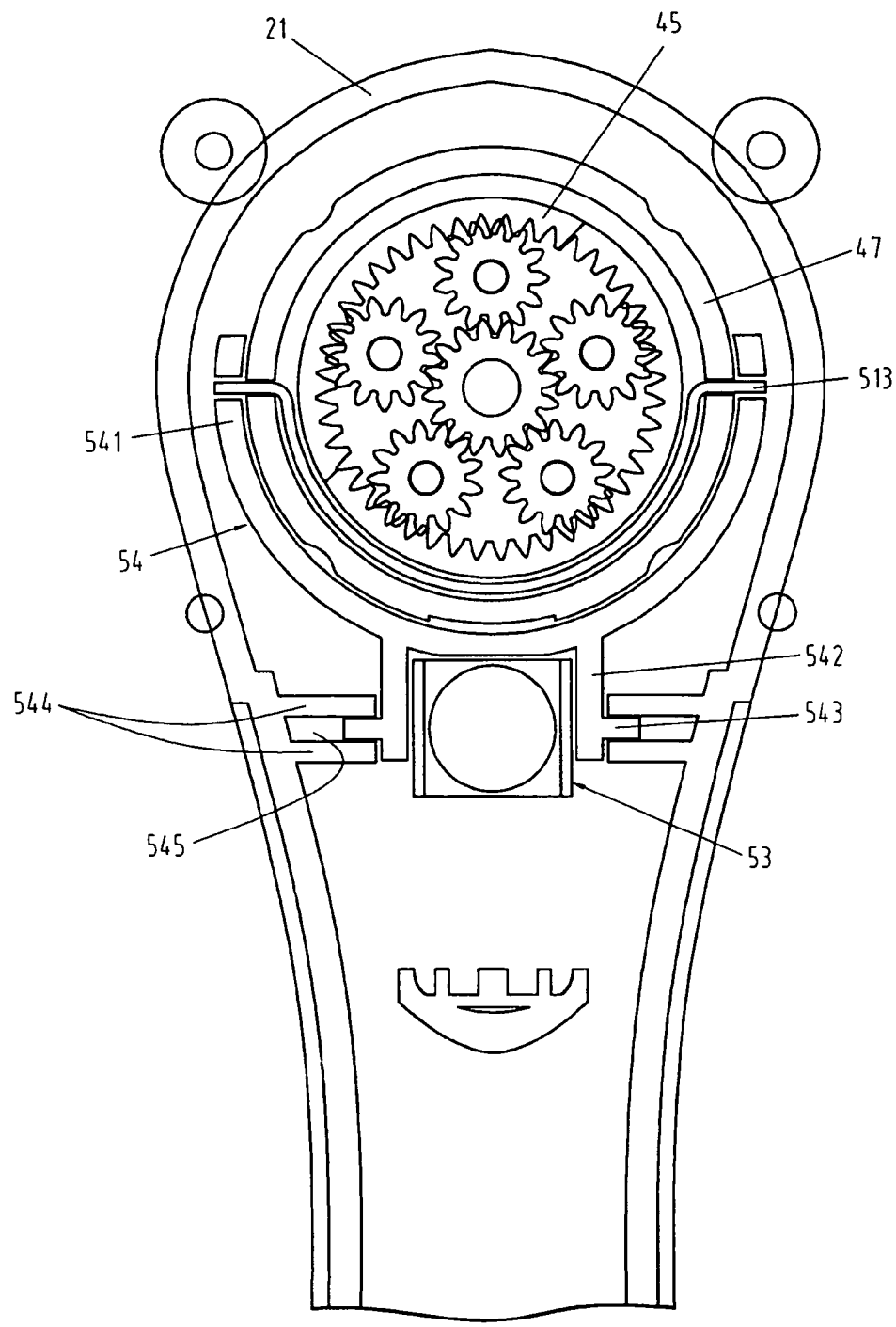
FIG. 12 is a partial cross-sectional view of the power tool taken along the line 12-12 of FIG. 11.
Figure 13:
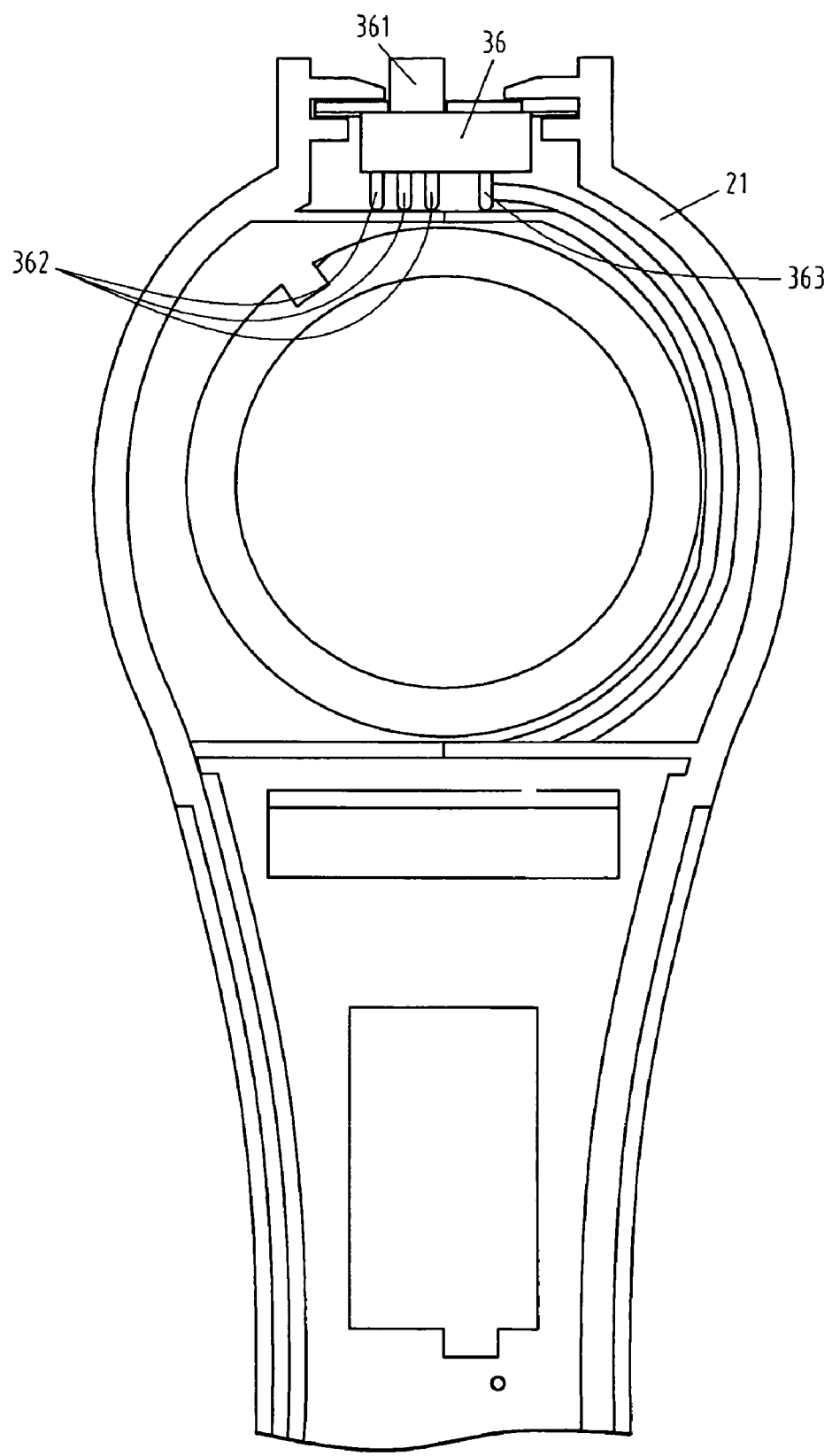
FIG. 13 is a partial cross-sectional view of the power tool taken along the line 13-13 of FIG. 11.
Figure 14:
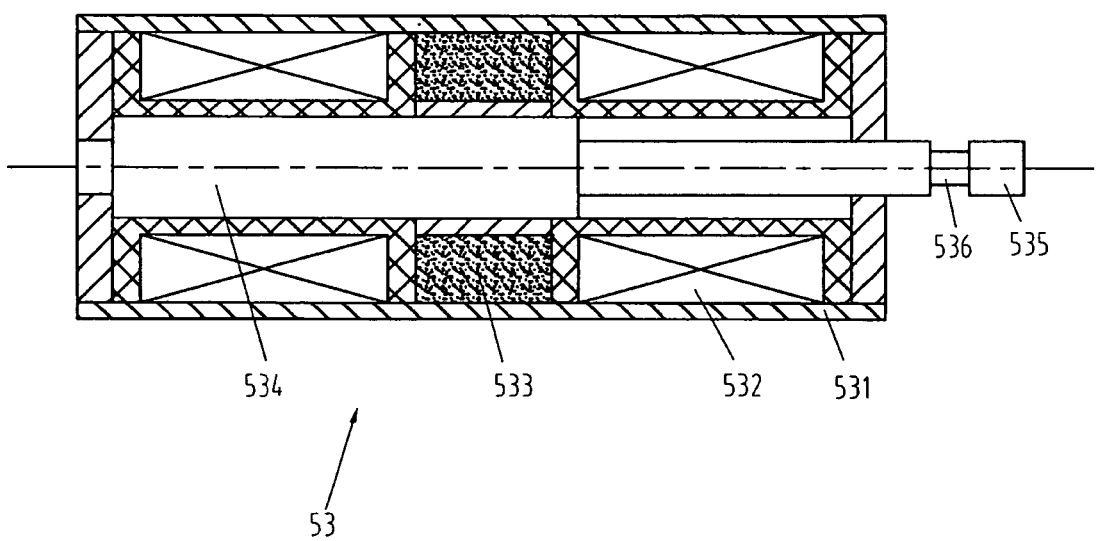
FIG. 14 is a cross-sectional view of a bi-directional keep solenoid of the power tool of FIG. 10.

The power tool according to a third embodiment of the present invention will be described with reference to FIGS. 10-14. In the third embodiment, the driving mechanism 5 is electromagnetic and comprises a bi-directional keep solenoid 53 capable of retaining the iron core at opposite ends of the travel of the iron core without electricity. Referring to FIG. 14, the bi-directional keep solenoid 53 includes a longitudinal magnetized metallic shell 531, a pair of coils 532 arranged longitudinally in the shell 531, a permanent magnet 533 disposed between the pair of coils 532, an iron core 534 linearly movable through the circled areas of the pair of coils 532 and a push bar 535 fixed to the iron core 534. The push bar 535 is provided near an end with a circumferential groove 536 exposed outside the shell 531. FIG. 14 shows that the push bar 535 is located at a rearward position and the iron core 534 is retained at this position due to attraction of the permanent magnet 533 even when no electric current flows through the coils 532. Referring to FIGS. 10 and 12, a connection member 54 is disposed between the steel wire 513 and the push bar 535 which includes a supporting arm 541 generally surrounding a lower half of the gear case 47 and a pair of spaced side plates 542 extending downward from the bottom of the supporting arm 541. The supporting arm 541 has two free ends connected to opposite radially extending ends of the steel wire 513. The side plates 542 extend rearwardly and engage the groove 536 to connect to the push bar 535. The bi-directional keep solenoid 53 is accommodated in the space between the pair of side plates 542. Referring to FIG. 12, a guiding mechanism is disposed between the side plates 542 and the housing 21. The guiding mechanism includes a pair of guide bars 543 extending laterally from each side plate 542 and two pairs of ribs 544 each extending laterally from each side of the housing 21 to define a guiding groove 545 for receiving and guiding the corresponding guide bar 543.

FIG. 10 shows that the push bar 535 of the bi-directional keep solenoid 53 is located at a forward position where it extends outside the shell 531 with a longer distance, whilst the iron core 534 is retained by the permanent magnet 533. In this position, the gear transmission mechanism 4 has a lower gear reduction ratio (ie the output shaft 6 or the power tool 9 is running at a high speed). At this time, the ring gear 45 engages the planet carrier 41 and planet gears 42 to rotate together. Referring to FIG. 14, when a forward electric current flows through the coils 532, a magnetic field is created to actuate the iron core 534 and the push bar 535 to move from the forward position to the rearward position. During this period, the connection member 54, the steel wire 513 and the ring gear 45 move together with the push bar 535 over a distance d (see FIG. 10). As the push bar 535 arrives at the rearward position, the ring gear 45 disengages the planet carrier 41 whilst still engaging the planet gears 42. In the meantime, the ring gear 45 engages the rotationally fixed structure 44 to be immovable with respect to the housing. Consequently, the gear reduction ratio increases whilst the output speed of the power tool decreases. If a reverse electric current is applied to the solenoid 53, the push bar 535 returns to the forward position and the gear reduction ratio decreases whilst the output speed of the power tool 9 increases.

Figure 15:
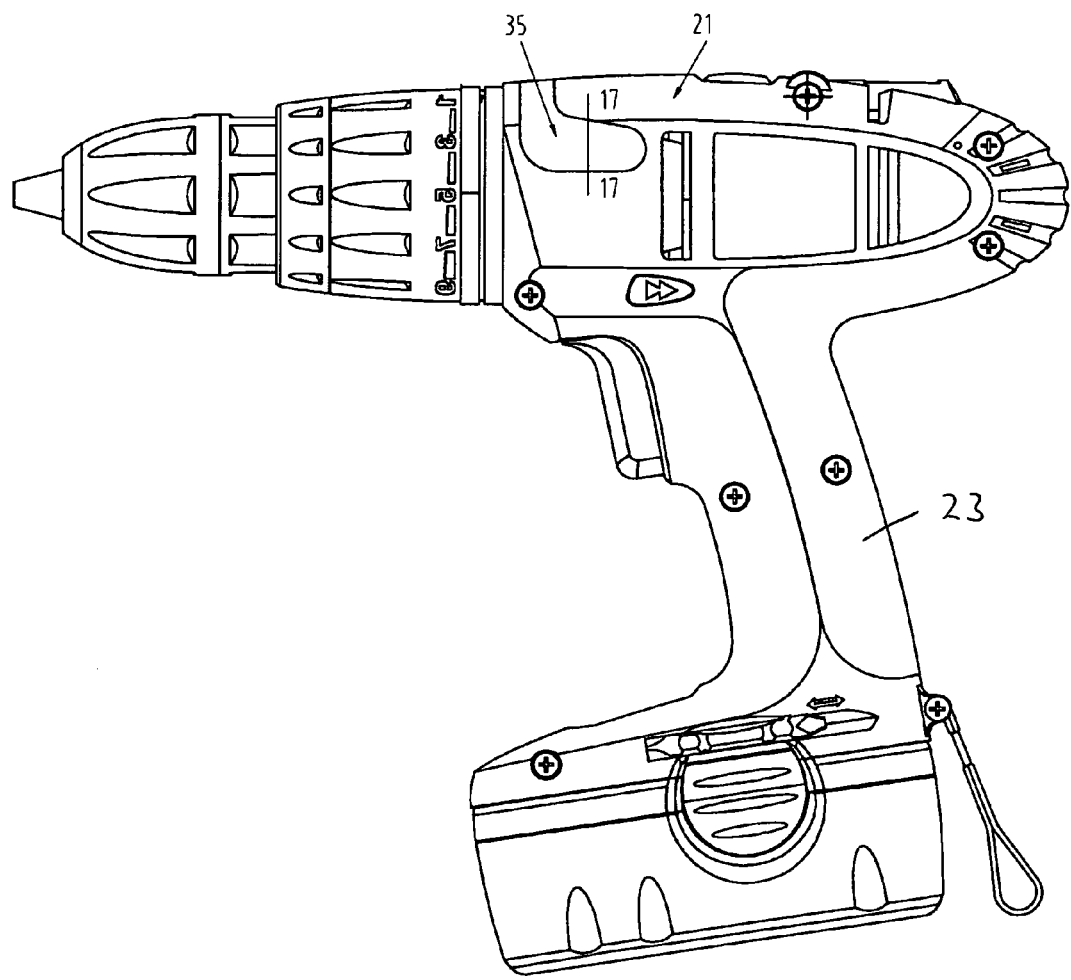
FIG. 15 is an elevational side view of a power tool of a fourth embodiment of the present invention with a signal generator disposed on the housing.
Figure 16:
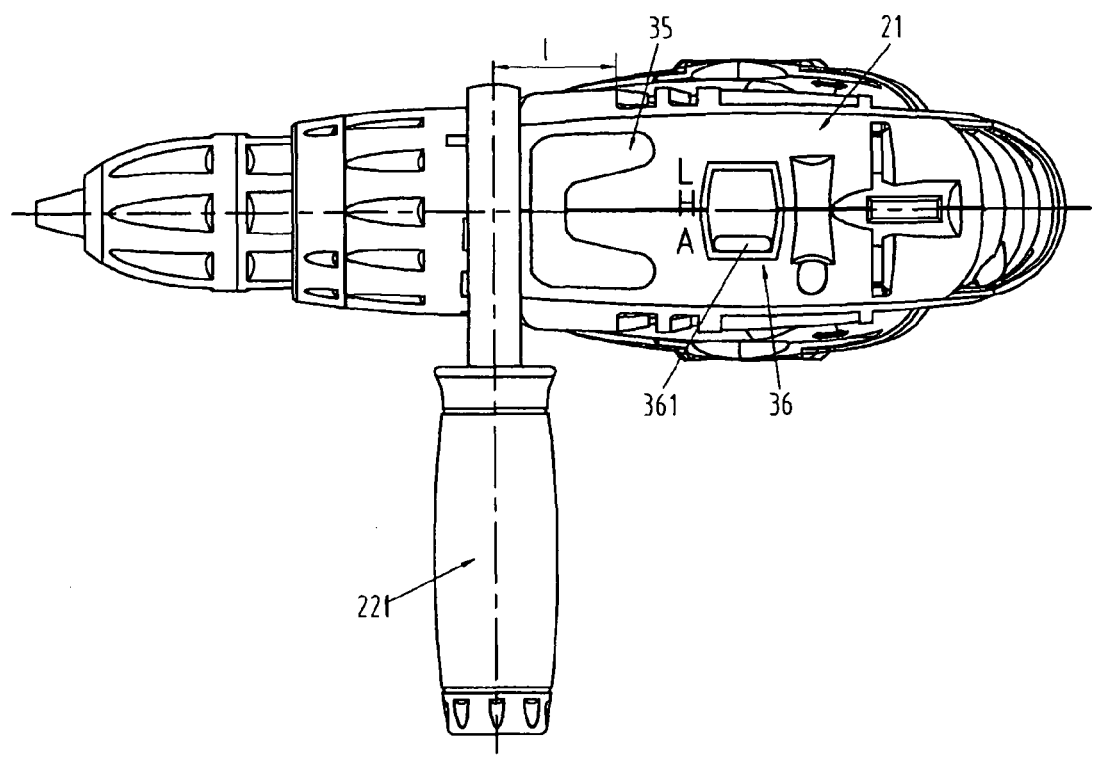
FIG. 16 is a top view of the power tool of FIG. 15 which additionally shows a side handle and a speed mode selector with a button adjustable between three positions.

The signal generator 35 of the power tool of a fourth embodiment of the present invention will be described with reference to FIGS. 15-17. As described above, when the signal generator 35 is activated, the electronic control system changes the direction of the electric current flowing through the driving mechanism 5 thereby activating the speed variation. Referring to FIG. 16, in conjunction with FIGS. 17a and 17b, the signal generator 35 includes a pair of switches disposed on respective halves of the housing 21. Each switch can activate the speed variation. By this arrangement, a left-handed operator and a right-handed operator can conveniently activate speed variation by a single touch of the switch.

Figure 17A:
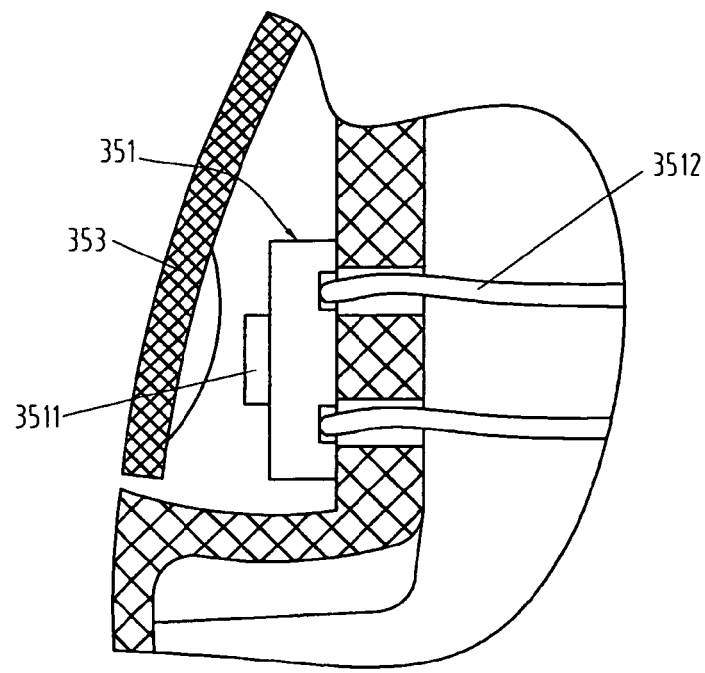
FIGS. 17a and 17b show two forms of an activation switch of the signal generator of FIG. 15.
Figure 17B:
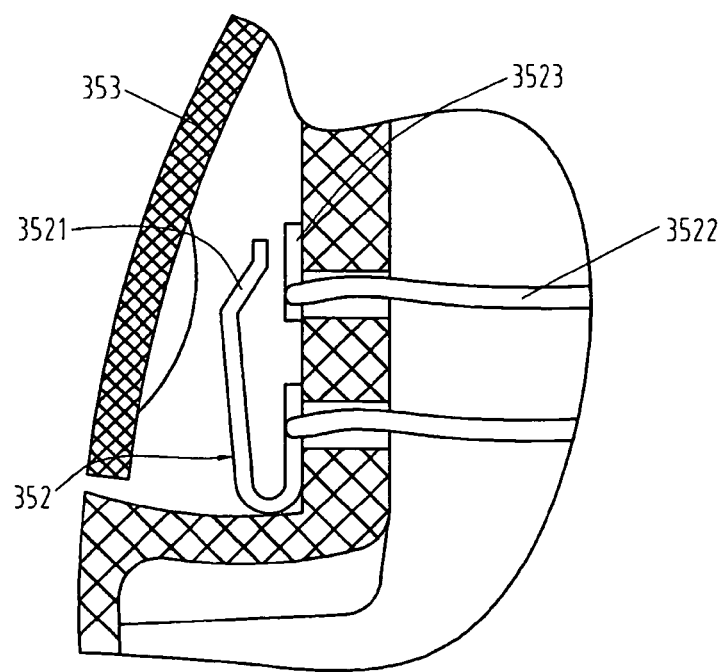

FIGS. 17a and 17b show two forms of the switch. As shown in FIG. 17a, a pushbutton switch 351 is mounted on the housing 21 and a spring plate 353 is mounted on the housing spaced apart and covering the pushbutton switch 351. If the operator wishes to vary the output speed of the running power tool 9, the spring plate 353 is depressed and presses a pushbutton 3511 to close the switch 351. An electrical signal is issued and outputted to the microcontroller 30 through wires 3512 to activate the speed variation (as described hereinafter). Similarly, FIG. 17b shows a spring switch 352 having a spring button 3521, contacts 3523 and wires 3522 electrically connecting the contacts to the microcontroller 30. As the spring plate 353 is depressed, the spring button 3521 is pressed to contact the contact 3523 and the electrical signal is generated and outputted via the wires 3522.

FIG. 16 shows a speed mode selector 36 for selectively activating or deactivating the automatic speed variation mode and selecting between high speed mode (H) and low speed mode (L) when in the deactivated state. The speed mode selector 36 includes a button 361 exposed on the housing 21 and a number of terminals electrically connected to electronic components (described hereinafter). The button 361 can be operated to slide on the housing 21 between three positions, namely auto mode position (A), high speed mode position (H) and low speed mode position (L). The terminals include three signal terminals 362 corresponding to above three mode positions and a ground terminal 363. The operation of the speed mode selector 36 will be described in detail hereinafter with reference to FIG. 20.

When the speed mode selector 36 is located at the auto mode position (A) shown in FIG. 16, the automatic speed variation is activated and cannot be interrupted. Even if the switch 351 or 352 is closed, the function achieved by the signal generator 35 would not be activated. Only when the button 361 of the speed mode selector 36 is adjusted to the high speed position (H) or the low speed position (L) can the activation of the signal generator 35 achieve speed variation.

Referring to FIG. 16, a side handle 221 is mounted on the housing 21. The side handle 221 is arranged at a predetermined distance 1 from the signal generator 35 where the switches 351, 352 are positioned in such a way that the signal generator 35 can be operated by the hand of the operator without needing to take the hand away from the handle. It will be apparent to those skilled in the art that the signal generator 35 can be arranged at a predetermined distance 1 from the main handle 23 such that the user can operate the signal generator 35 with the hand holding the main handle 23.

Figure 18:
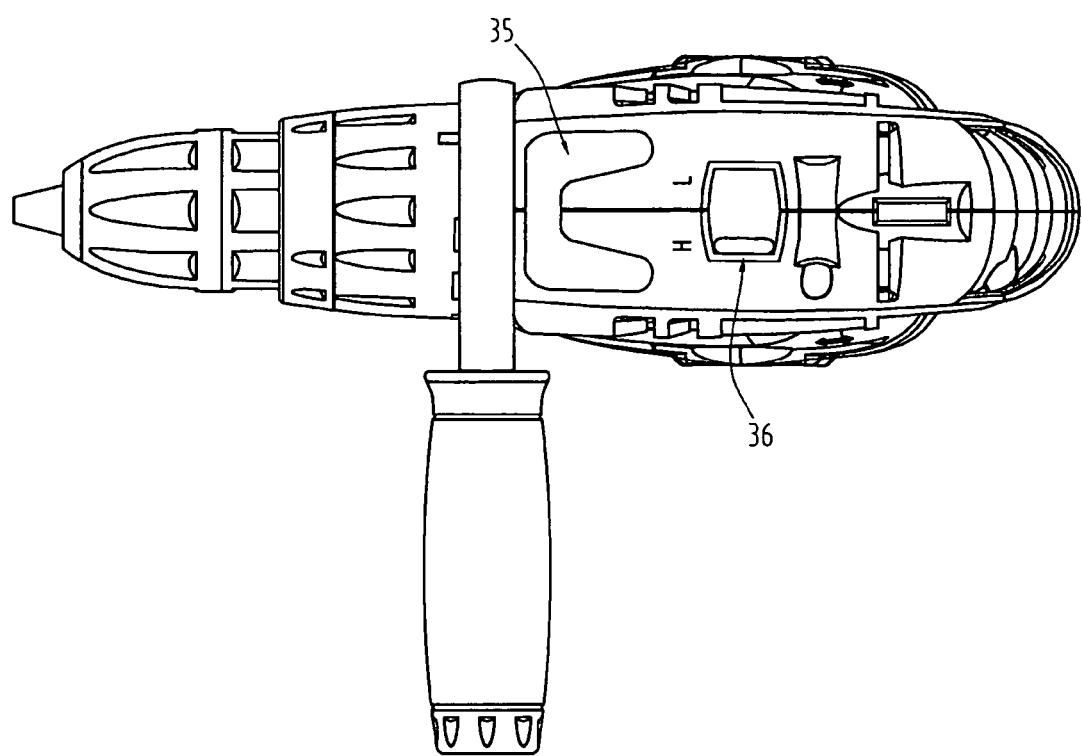
FIG. 18 is a top view of a power tool of a fifth embodiment of the present invention with a speed mode selector with two positions.
Figure 19:
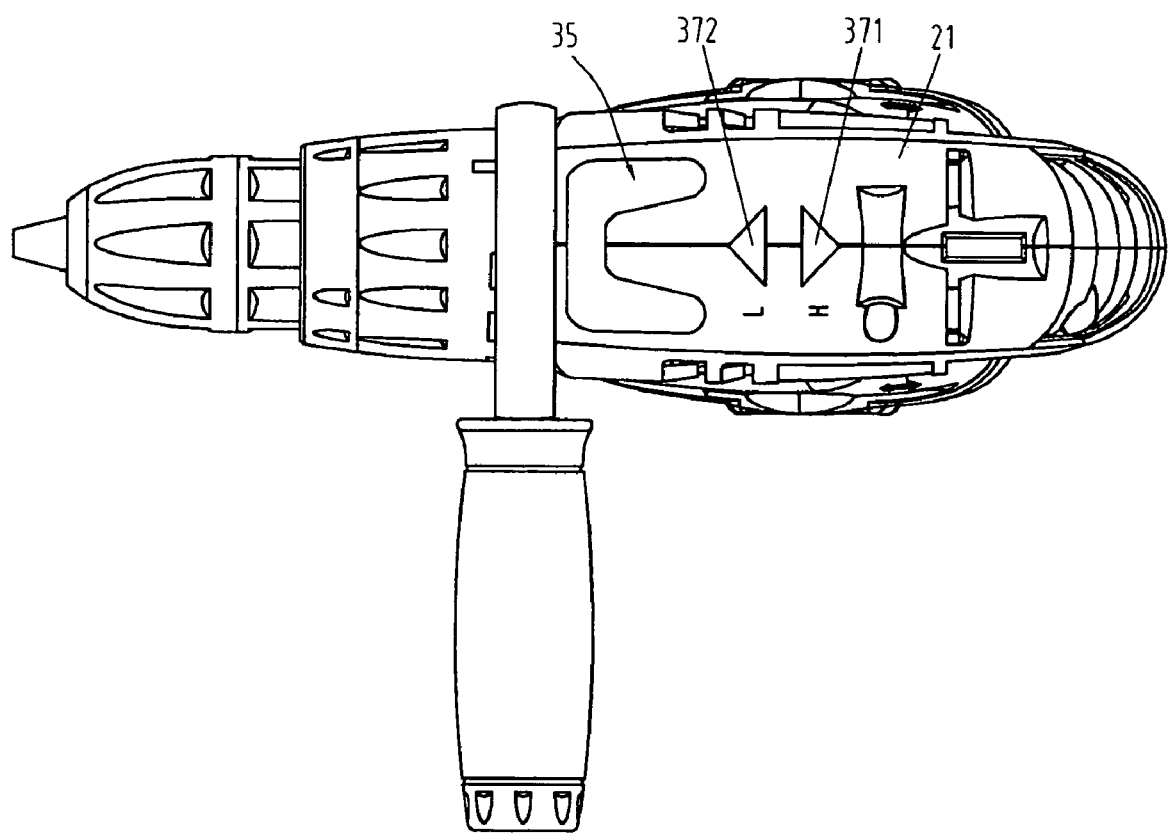
FIG. 19 is a top view of a power tool of a sixth embodiment of the present invention with two LEDs representative of high speed and low speed.

FIGS. 18 and 19 illustrate fifth and sixth embodiments of a power tool of the invention with alternative combinations of the signal generator and the speed mode selector. In the fifth embodiment in FIG. 18, the speed mode selector 36 can be switched between two speed positions only, namely a high speed position H and a low speed position L. When the button 361 is located at the high speed position H, activation of the signal generator 35 can switch the movable member to the low speed position L. Similarly, activation of the signal generator 35 can switch the movable member 45 from the low speed position L to the high speed position H.

The power tool of the sixth embodiment is not equipped with a speed mode selector button. Instead, two light emitting diodes (LED) 371, 372 are disposed on the housing 21 for indicating the high speed position and the low speed position respectively. In this embodiment, the power tool starts at a defaulted auto mode. On activating the signal generator 35, the auto mode is interrupted and the speed position will be switched. For example, the power tool initially runs in the auto mode at high speed and the H-LED 371 is illuminated to represent the high speed state. As the signal generator 35 is activated, the auto mode is interrupted and the speed state is switched to and maintained at low speed until the signal generator 35 is activated again or the power supplied to the motor 2 varies. If the signal generator 35 is activated again, the high speed state is resumed and maintained.

Figure 20:
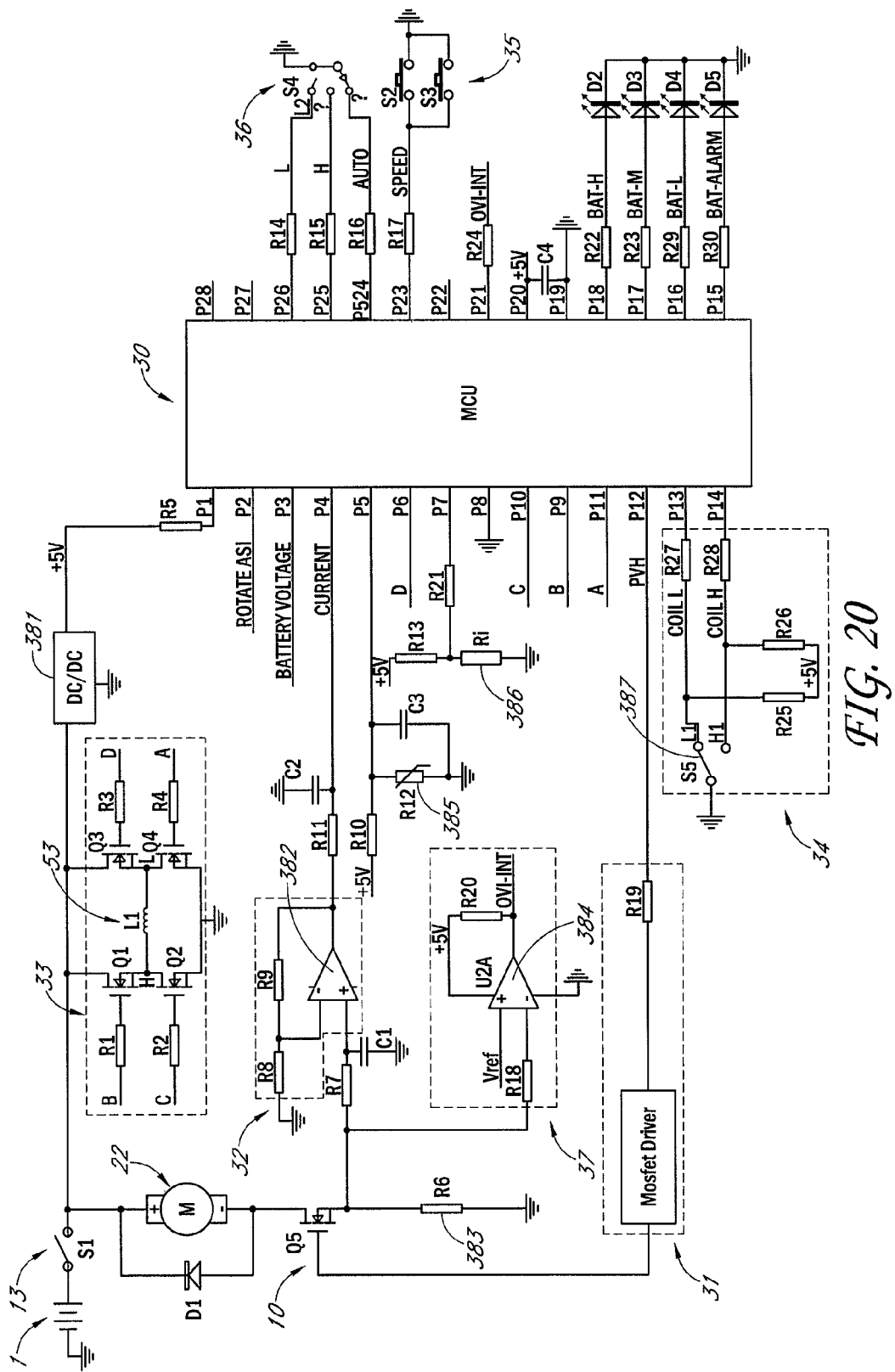
FIG. 20 is a simplified circuit diagram of a preferred embodiment of the power tool of the invention showing the electronic control system connected to the motor and the power supply.

FIG. 20 is a simplified circuit diagram of the control system of a preferred embodiment of the present invention. The control system is connectable to the power supply 1 via the main switch 13 (S1). In the present embodiment, the cells have a lithium-based chemistry and the battery pack has a nominal voltage of approximately 18V.

Referring to FIG. 20 in conjunction with FIG. 6, the electronic control system 8 includes a microcontroller 30, a speed modulating circuit 31, a load detecting circuit 32, a driving mechanism control circuit 33, a position feed back circuit 34, a signal generator 35 and a speed mode selector 36.

The microcontroller 30 is a microcomputer with its memory and Input/Output (I/O) integrated into a single chip. The microcomputer is a computer built using a microprocessor and other components for the memory and I/O. The microprocessor generally refers to the implementation of the central processor unit functions of a computer in a single, large scale integrated circuit. The microcontroller typically includes a central processing unit (CPU), a read-only memory (ROM), a random access memory (RAM), a timer, a digital-to-analog (A/D) converter and a number of input/output ports P1-P28.

As shown in FIG. 20, the main switch 13 controls the battery pack voltage across a DC/DC converter 381 to be converted to a relative low constant voltage that serves as the power source for the control system. In the present embodiment, the constant voltage value is 5V. As the main switch 13 is closed, the constant voltage is supplied to the microcontroller 30 via the port P20. A signal is outputted for initializing the microcontroller 30 to the input port P1. The main switch 13 may be a potentiometer to which is coupled a trigger button 131 (see FIG. 10). As the trigger button 131 is depressed, the potentiometer 13 provides a signal in accordance with the degree of the depression to the microcontroller 30 via the input port P2. The microcontroller 30 then outputs a signal through the output port P12 to the speed modulating circuit 31 so as to control the power switch 10 for controlling the voltage applied across the motor 2. The speed modulating circuit 31 may be a metallic oxide semiconductor field effect transistor (MOSFET) drive circuit and the power switch 10 may be a MOSFET. The microcontroller 30 may output a pulse width modulated (PWM) control signal dependent on the potentiometer signal received at port P2 to the MOSFET drive circuit 31 and the circuit 31 varies the duty cycle of the PWM control signal. For example, as the trigger button 131 is more deeply depressed, the circuit 31 increases an "on-time" duration of each cycle of the PWM control signal in response to the current position of the trigger button 131. Thus a larger current flows through the motor 2 to increase its rotational speed. It will be apparent to the skilled person in the art that the MOSFET drive circuit may also vary the duty cycle frequency of the PWM control signal to vary the speed of the motor 2.

The microcontroller 30 is designed to detect the battery pack voltage at port P3. The microcontroller 30 may read the signal received at port P3 indicative of the residual capacity of the battery pack 1. The signal may be a voltage signal. The microcontroller may then compare it with a selected threshold value to judge whether the battery pack is over-discharged. If the battery pack 1 is over-discharged, the microcontroller 30 may process an over-discharge protection program such as blocking the output port P12 to interrupt the power supplied to the motor 2. As shown in FIG. 20, four LEDs D2, D3, D4, D5 are connected to the ports P18, P17, P16, P15 via resistors R22, R23, R29, R30 respectively.

These LEDs may be disposed on the housing, on the handle or at other areas of the power tool visible to the operator. These LEDs may emit light in different combinations or in different colors to indicate different residual capacity levels of the battery pack 1. The LEDs D2, D3, D4 emit green light whilst the LED D5 emits red light.

LEDs D2, D3 and D4 are used to show that the residual capacity of the battery pack is at a normal level, LED D5 is used to show that the residual capacity of the battery pack is at a lower level or in an over-discharge state. When the residual capacity is full, LEDs D2, D3 and D4 are illuminated constantly whilst LED D5 is non-illuminated. When the residual capacity is at a relatively high level, LEDs D3 and D4 are constantly illuminated whilst LEDs D2 and D5 are non-illuminated. When the residual capacity is at a middle level, LED D4 is constantly illuminated whilst LED D2, D3 and D5 are non-illuminated. When the residual capacity is at a relatively low level, LED D2, D3 and D4 are non-illuminated whilst LED D5 is constantly illuminated. As the battery pack is over-discharged, LED D2, D3 and D4 are non-illuminated, while LED D5 blinks. In the mean time, the microcontroller 30 controls the MOSFET drive circuit to interrupt the power supplied to the motor 2.

As stated above, the resistor 383 is connected in series with the motor 22 and the power switch 10 to be used by the microcontroller 30 to detect the motor current indicative of a load applied to the power tool 9. The load detecting circuit 32 is connected between the resistor 383 and the microcontroller 30. The load detecting circuit 32 is an amplifying circuit which includes an operational amplifier 382 and resistors R8, R9 for determining an amplifying ratio. The operational amplifier 382 amplifies the voltage drop caused by the resistor 383 at the predetermined amplifying ratio and outputs a signal to the port P4. The microcontroller 30 reads the signal and determines whether the current flow through the motor reaches the switching point Ic (see FIG. 9). In addition, an over-current detecting circuit 37 is also connected between the resistor 383 and the microcontroller 30. The over-current detecting circuit 37 may include a comparator 384 and a resistor (not shown) connected between the constant voltage supply (+5V) and the comparator 384 to provide a reference voltage to one input (+) of the comparator 384. The comparator 384 receives a voltage signal indicative of the voltage drop caused by the resistor 383 at the other input (−) thereof and compares it with the reference voltage to determine whether the motor is over-current. The comparator 384 then outputs a high state signal or low state signal indicative of non over-current or over-current respectively to the port P21 through resistor R24. The microcontroller 30 then executes an over-current protection algorithm which will be described hereinafter. In addition, a temperature sensing device 385 is coupled between the motor 22 and the microcontroller 30. The temperature sensing device may be a negative temperature co-efficient (NTC) resistor R12 or thermistor adhered to the motor surface. The resistance value of R12 varies with the motor temperature. A circuit composed of the resistor R10 and R12 can be used to provide an analog signal representative of the voltage drop caused by the resistor 385 to the microcontroller 30 through the port P5. The microcontroller 30 may receive and interrupt the analog signal into a digital signal to indicate the motor temperature and then compare it with a preselected threshold value to determine whether the motor is over-temperature.

The battery pack 1 includes an identification resistor 386 (Ri) connected to the microcontroller 30 via input port P7 to indicate the type or capacity of the battery pack. After the battery pack is attached to the power tool, the resistor Ri together with the resistors R13 and R21 form a voltage divider circuit. The microcontroller 30 receives via port P7 an analog signal which can be interpreted by the microcontroller 30 to identify the type or capacity of the battery pack. The microcontroller 30 then determines a corresponding discharging protection program to avoid over-discharging.

The driving mechanism control circuit 33 is connected between the driving mechanism 5 and the microcontroller 30 and between the power supply 1 and the ground. The driving mechanism control circuit 33 is an H-bridge circuit and the driving mechanism is a bi-directional keep solenoid 53. The H-bridge circuit includes four input ports A, B, C, D connected to the ports P11, P9, P10, P6 respectively and four semiconductor switches Q1, Q2, Q3, Q4 connected to the ports B, C, D, A via resistors R1, R2, R3, R4 respectively. The bi-directional keep solenoid 53 is connected between an H node between the semiconductor switches Q1, Q2 and an L node between the semiconductor switches Q3, Q4. The semiconductor switches Q1, Q2, Q3, Q4 are MOSFET (although other switches may be used). The microcontroller 30 controls the open or closed state of the input ports A, B, C, D of the H-bridge circuit to vary the movement direction of the iron core 534 or push bar 535 of the solenoid 53. For example, as the input ports A, B are closed while the input ports C, D are open, the electric current supplied by the power source 1 sequentially flows through the switch Q1, the H node, the solenoid 53, the L node, the switch Q4 and ground. In other words, the electric current applied to the solenoid 53 is in the direction of H to L. On the contrary, if the input ports A, B are open while the input ports C, D are closed, the electric current supplied by the power source 1 sequentially flows through the switch Q3, the L node, the solenoid 53, the H node, the switch Q2 and ground. In other words, the electric current applied to the solenoid 53 is in the direction of L to H. By varying the current applied to the solenoid, the push bar 535 is able to move the ring gear 45 from the high speed position to the low speed position or from the low speed position to the high speed position.

The position feed back circuit 34 is connected to microcontroller 30 and includes a single-pole double-throw switch 387 (S5) and resistors R25', 26, R27, R28. As shown in FIG. 20, the switch 387 has two contacts L1, H1. In this case, the pole contacts the contact L1 which means the ring gear 45 is located at the low speed position. The switch 387 outputs a low state signal through resistor R27 to the port P13 of the microcontroller 30 and outputs a high state signal through resistor R28 to the port P14 of the microcontroller 30. Once the ring gear 45 is actuated and reaches the high speed position, the pole contacts the contact H1 and leaves the contact L1 open. In this case, the microcontroller receives the high state signal via port P13 and receives the low state signal via port P14. The switch 387 is composed of a pair of metallic contacts H1, L1 positioned in the housing at opposite ends of the linear travel of the connection member 54 and a metallic plate (to function as the pole) attached on the connection member 54. As the metallic plate contacts each of the metallic contacts H1, L1, a low state signal will be generated and transmitted to the microcontroller 30 via the port P13 or P14 representative of the present speed position. Thus the microcontroller 30 is able to detect the present speed position. The metallic contacts and plate can be disposed on the ring gear and in the gear case respectively or on the push bar and in the housing respectively.

The speed mode selector 36 has three signal contacts corresponding to auto mode A, high speed mode H2 and low speed mode L2. The auto A, high speed H2 and low speed L2 contacts are connected to the ports P24, 25, 26 of the microcontroller 30 via resistors R16, R15, R14 respectively. Similar to the switch 387 of the load feed back circuit 34, if any of the three contacts A, H2, L2 is closed, the microcontroller 30 will receive a low state signal and identify which port inputs the signal. Thus the microcontroller 30 can know which mode is selected and then execute an algorithm for the selected mode as described hereinafter.

The signal generator 35 includes two activation switches S2, S3 arranged in parallel and is connected to the port P23 via resistor R117. If either of the two switches S2, S3 is activated, an interrupt electric signal will be generated and outputted to the microcontroller 30 via the port P23. The selected operation then interrupts the currently processing program and executes a one touch speed variation algorithm which will be described hereinafter.

Figure 21:
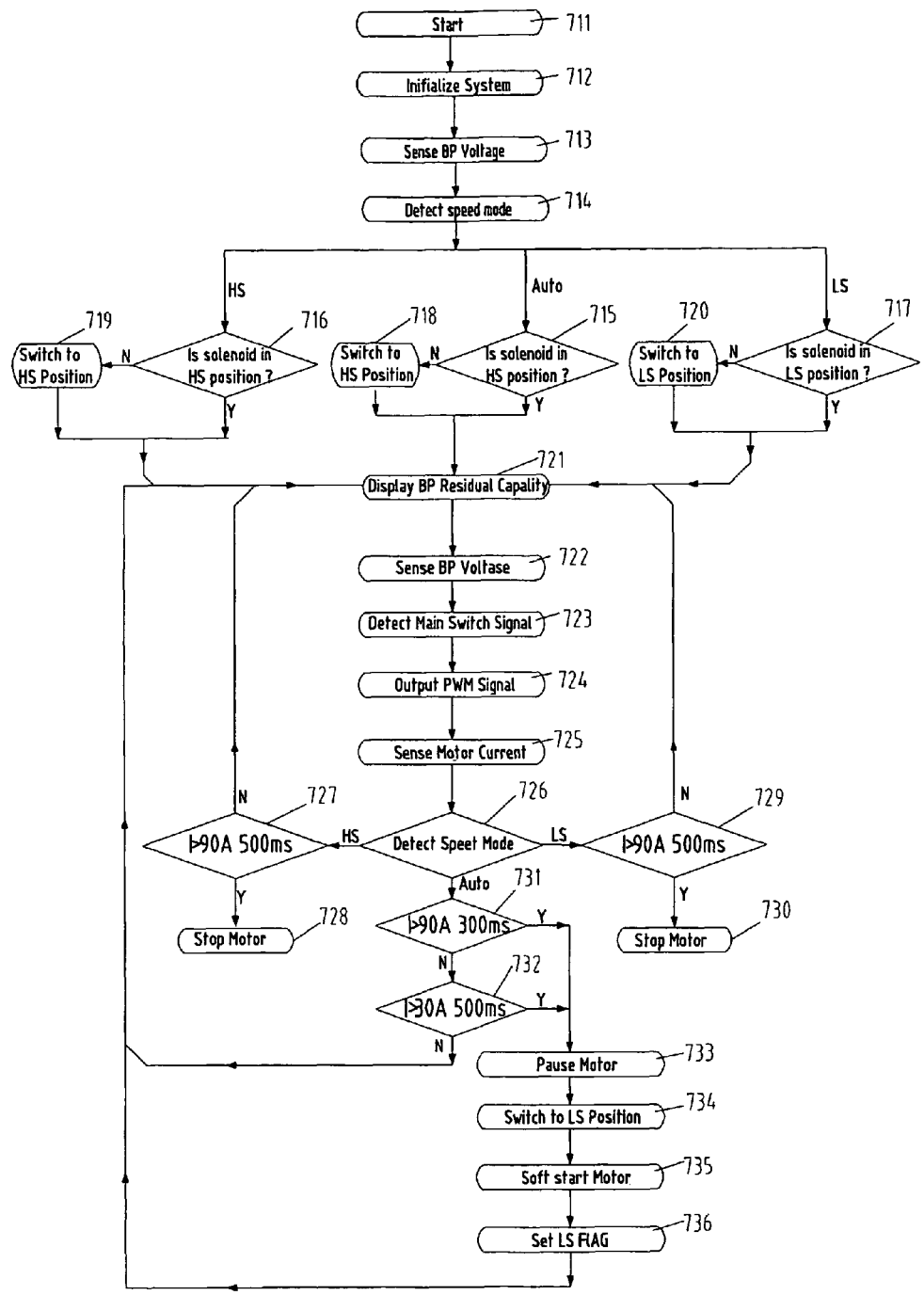
FIG. 21 is a flowchart illustrating an operation of the electronic control system for automatic speed variation.

Referring to FIG. 21, once the operator has actuated the trigger button 131, the main circuit is closed (step 711). A reset signal is then inputted through port P1 to the microcontroller to initialize the microcontroller (step 712). The microcontroller 30 then samples the voltage signal of the battery pack through port 3 to judge whether or not the battery pack has been over-discharged (step 713). If yes, the microcontroller 30 will not proceed. If no, the microcontroller 30 then detects which speed mode is currently selected by reading the signal state at ports P24, P25, P26 (step 714). When the microcontroller 30 detects that the auto mode is selected, it judges whether or not the push bar 535 of the solenoid 53 is located at the high speed position by reading the signal state at ports P13, P14. If yes, the microcontroller 30 proceeds to step 721. If no, the microcontroller 30 controls the H-bridge circuit 33 to vary the direction of electric current applied to the solenoid 53 for switching the movable member 45 to the high speed position and then proceeds to step 721. When it is detected that the high speed mode is selected, the microcontroller 30 further detects whether or not the solenoid is located at the high speed position (step 716). If yes, the microcontroller 30 proceeds to step 721. If no, the microcontroller 30 controls the movable member 45 to switch to the high speed position (step 719) and then proceeds to step 721. In a similar manner, when it is detected that the low speed mode is selected, the microcontroller 30 further detects whether or not the solenoid 53 is located at the low speed position (step 717). If yes, the microcontroller 30 proceeds to step 721. If no, the microcontroller 30 controls the solenoid 53 to switch the movable member 45 to the low speed position (step 720) and then proceeds to step 721.

At step 721, the microcontroller 30 controls the LEDs D2 to D5 to show current residual capacity level of the battery pack. The microcontroller 30 monitors the voltage across the battery pack 1 in real time (step 722) and cuts off the power supplied to the motor 2 when the battery pack 1 is over-discharged. The microcontroller 30 then detects the signal from the potentiometer 13 indicative of the depression degree of the trigger button 131 (step 722) and outputs the PWM control signal to control the rotational speed of the motor 2 (step 723). As the motor 2 runs, the microcontroller 30 monitors the current flow through the motor 2 (step 724).

The microcontroller 30 then detects the speed mode again (step 726). If it is detected that the present mode is the high or low speed mode, the microcontroller 30 then judges whether or not the motor current exceeds 90 A for 500 ms (step 727 or 729). If yes, the motor 2 may have stalled thereby causing the motor current to increase sharply. Thus the power supplied to the motor 2 is cut off (step 728 or 730). If no, the program returns to step 721. If it is detected that the present mode is auto mode, the microcontroller 30 then judges whether or not the motor current exceeds 90 A for 500 ms (step 727 or 729).

If yes, the motor 2 may have stalled, and the microcontroller 30 executes the automatic speed variation steps which will be discussed hereinafter. If no, the microcontroller 30 further judges whether or not the motor current exceeds 30 A for 500 ms (step 732). If yes, the microcontroller 30 executes the automatic speed variation steps. If no, the program returns to step 721. Step 732 is conducted to judge whether or not the motor current value reaches the switching point where the output efficiency curve of the power tool 9 at high speed and that at low speed intersect. Thus, if the motor current value equals or is larger than a predetermined value for a preset time period, the automatic speed variation is activated. It will be apparent that the automatic speed variation can also be activated immediately as the motor current value equals the predetermined value.

The automatic speed variation steps include steps 733 to 736. In order to avoid gear clash when the ring gear 45 moves from the high speed position to the lower speed position, the rotational speed of the ring gear 45 is reduced (preferably to zero). In this case, the microcontroller 30 temporarily interrupts the power supplied to the motor (step 733). For example, the port P12 is blocked from outputting the PWM control signal thereby reducing the rotational speed of the movable member 45 to zero. The microcontroller 30 then controls the solenoid 53 to move the movable member 45 to the low speed position. As described previously, the microcontroller 30 may control the H-bridge circuit 33 to apply a forward electric current to the solenoid (ie to close the input ports A, B and open the input ports C, D). Thus the push bar 534 of the solenoid 53 is actuated to move from the high speed position to the low speed position (step 734). As the movable member 45 reaches the low speed position, the position feed back switch S5 is activated and generates a low state signal output to the microcontroller 30 through port 13. The microcontroller 30 then soft starts the motor (step 735). In this case, the microcontroller may vary the duty cycle of the PWM control signal to step up the voltage applied to the motor until the rotational speed of the motor returns to a normal state. After that, an LS flag is set to indicate current speed position (step 736) and then the program returns to step 721. A time interval is required for the ring gear 45 to move from the high speed position to the low speed position. Thus the solenoid can be activated prior to pausing the motor. In this case, the rotational power of the motor is removed before the ring gear meshes the rotationally fixed structure. By this means, the rotational speed of the ring gear is not reduced to zero. Since there is no driving power applied to the ring gear, the ring gear is able to engage with the rotationally fixed structure smoothly and come to a standstill quickly.

Figure 22:
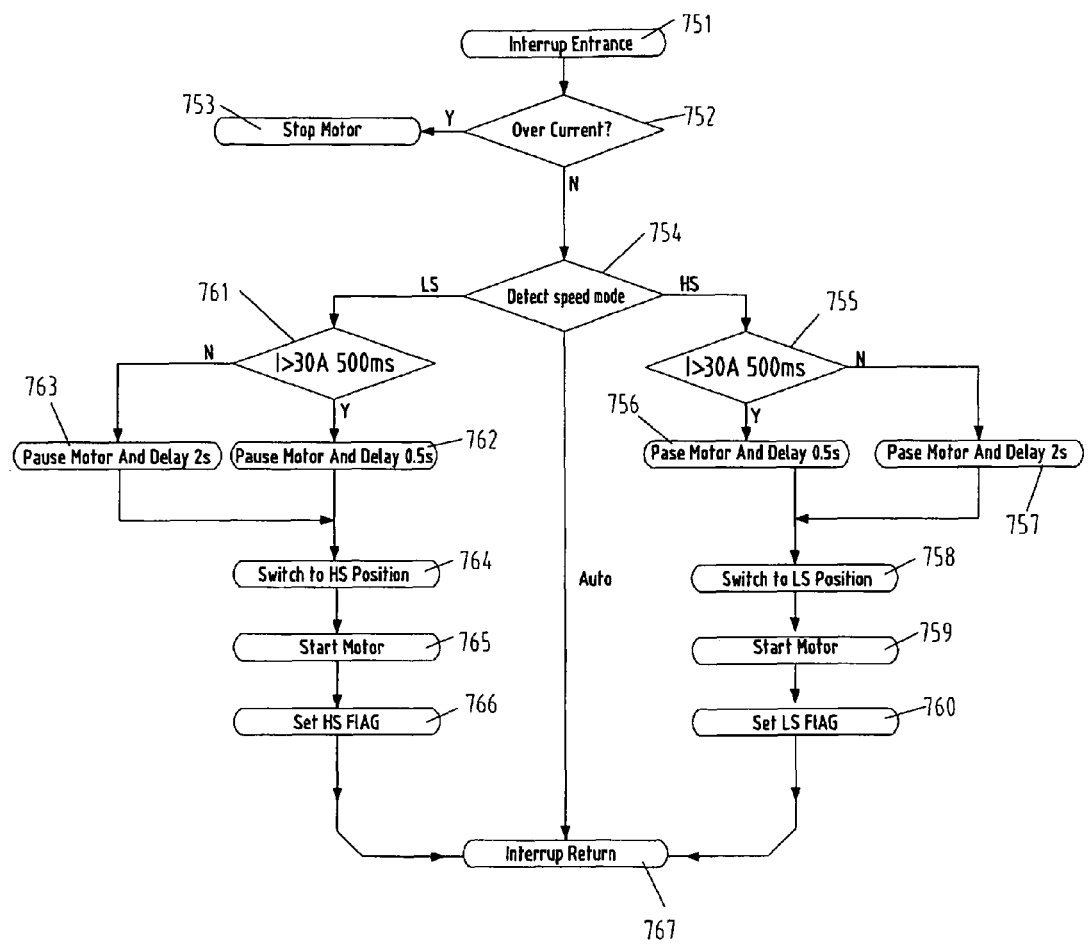
FIG. 22 is a flowchart illustrating an operation of the electronic control system for one touch speed variation.

Referring to FIG. 22, as the port 23 of the microcontroller 30 receives an interrupt signal generated by the signal generator 35, the microcontroller 30 interrupts the current processing program and turns to one touch speed variation program (step 751). Initially, the microcontroller 30 reads the motor current value via port P21 and judges whether or not the motor current exceeds a preset threshold value such as 98 A (step 752). If yes, the motor 22 may be stalled. The microcontroller 30 then controls the MOSFET drive circuit 31 to interrupt the power supplied to the motor 22 (step 753). If no, the microcontroller 30 then detects what current speed mode is (step 754). If the current speed mode is the auto mode, the microcontroller 30 ends the present program. If the current mode is the high speed mode or the low speed mode, a judgment is made on whether a load is applied to the power tool. This is because when a load is applied, the motor speed is reduced faster than when no load is applied. In other words, the motor with no load needs more time to stop. To detect whether a load is applied, the microcontroller 30 judges whether or not the motor current exceeds 30 A for 500 ms (steps 755 or 761). If yes, there is no load applied and the microcontroller 30 pauses the motor 22 and waits 0.5 s (steps 756 or 762). If no, there is a load applied and the microcontroller 30 then pauses the motor 22 and waits 2 s (steps 757 or 763). The microcontroller 30 then controls the solenoid 53 to move the movable member 45 to the low speed position (steps 758) or the high speed position (steps 764), starts the motor 22 again (steps 759 or 765) and sets a LS or HS flag to indicate present speed position (steps 760 or 766). After that, the microcontroller 30 ends the current program and returns to the main program.

Figure 24:
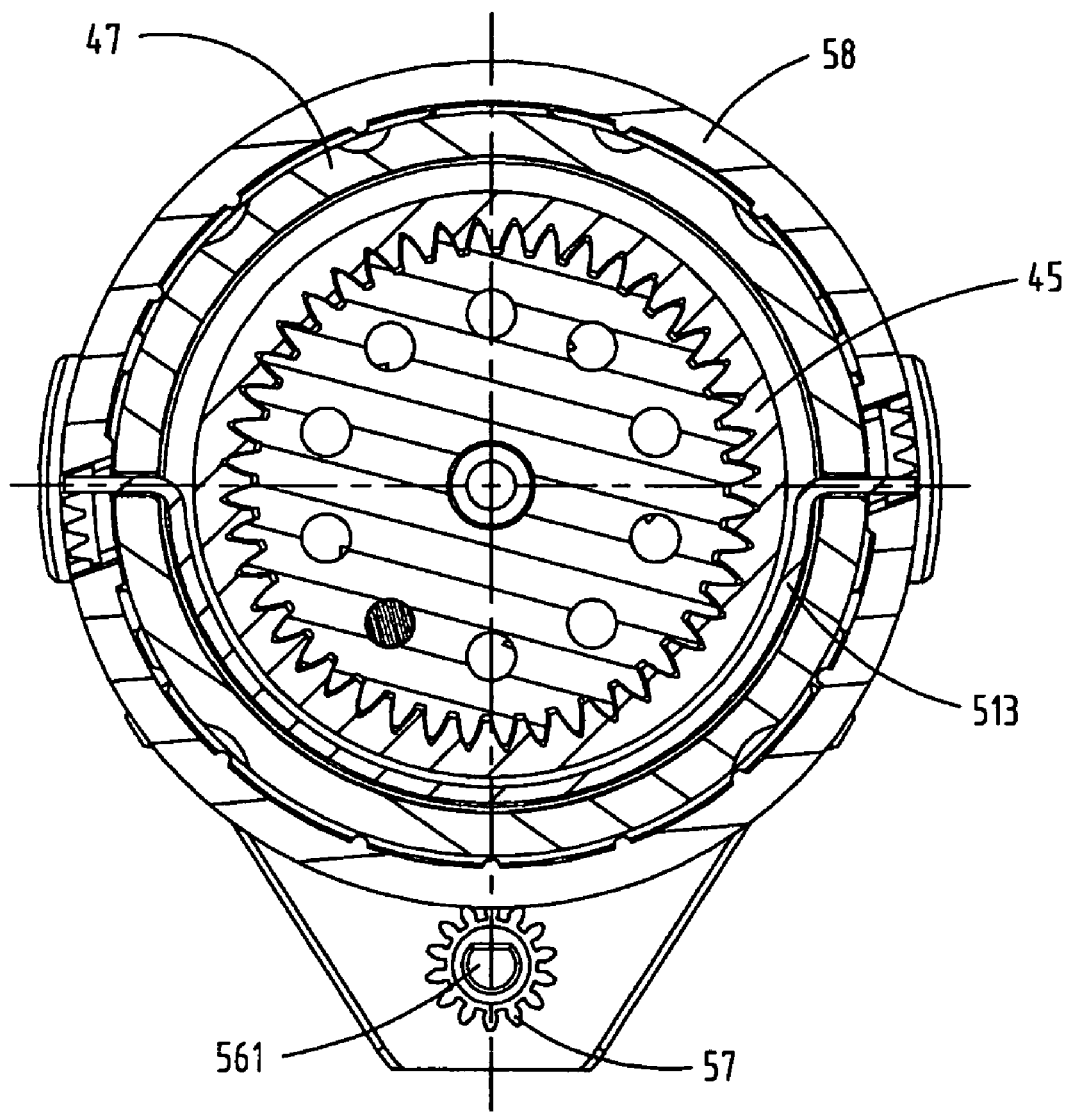

FIGS. 23a, 23b and 24 show a seventh embodiment of a power tool 9 of the present invention and its driving mechanism 5. The driving mechanism 5 includes a small motor 55, a small gear transmission mechanism 56 having an output spindle 561 for outputting rotary power of the small motor 55, a gear 57 mounted on the output spindle 561 and a circular sleeve 58 rotatably mounted on the outside of the gear casing 47. The circular sleeve 58 has a pair of diametrically opposed grooves defined in the circumferential wall for respectively receiving and guiding opposite distal ends of a steel wire 513 and external teeth 584 formed on the circumferential surface. Each groove has first and second sections 581, 583 substantially perpendicular to the longitudinal axis (the broken lines in FIGS. 23a and 23b) of the power drill 9 and a third section 582 disposed between the first and the second sections 581, 583 extending obliquely to the longitudinal axis.

FIGS. 23a and 23b show the power tool 9 in a high speed and low speed state respectively. On start up of the small motor 55, the gear 57 mounted on the output spindle 561 attains a rotational speed and actuates the sleeve 58 to rotate by engaging the external teeth 584. In this case, the steel wire 513 is urged by the third section 582 of the groove to move in the longitudinal direction and the movable member 45 moves with the steel wire 513 from one speed position to the other to achieve automatic speed variation. The small motor 55 is electrically connected to an H-bridge circuit controlled by a microcontroller as described hereinbefore so that it can rotate in the opposite direction as the direction of the current is changed. The small gear transmission mechanism can be omitted if the direct output speed of the small motor 55 is relatively low.

In the present invention, the structures of the gear transmission mechanism and the movable member are not limited to those described in the above mentioned embodiments. There are various types of conventional gear transmission mechanism (see for example U.S. Pat. No. 6,796,921) to which the present invention may be applicable.

What is claimed is:

1. A power tool capable of variable output speed comprising:
   a housing;
   a motor contained in the housing for outputting rotary power;
   an output shaft;
   a gear transmission mechanism disposed between the motor and the output shaft for transmission of the rotary power of the motor to the output shaft at each of a plurality of gear reduction ratios;
   a signal generator; and
   a control system electrically coupled to the signal generator and operatively engaged with the gear transmission mechanism such that when the signal generator is manually activated, an electric signal is generated and transmitted to the control system to cause the gear transmission mechanism to vary the gear reduction ratio;
wherein the signal generator comprises a switch mounted on the housing;
wherein the control system comprises:
   a control unit electrically connected to the switch to receive the electrical signal when the switch is activated; and
   a driving mechanism actuated by the control unit in response to the electrical signal to cause the gear transmission mechanism to vary the gear reduction ratio;
wherein the gear transmission mechanism comprises:
   at least one gear train; and
   a movable member movable between a first position corresponding to a low gear reduction ratio and a second position corresponding to a high gear reduction ratio whereby to vary the gear reduction ratio;
wherein the gear train is a planetary gear train which includes a plurality of planet gears, an adjacent planet carrier, and a rotationally fixed structure immovably associated with the housing;
wherein the movable member comprises a ring gear which when located at the first position engages the planet gears and the planet carrier and when located at the second position engages the planet gears and the rotationally fixed structure.

2. A power tool capable of variable output speed comprising:
a housing;
a motor contained in the housing for outputting rotary power;
an output shaft;
a gear transmission mechanism disposed between the motor and the output shaft for transmission of the rotary power of the motor to the output shaft at each of a plurality of gear reduction ratios;
a signal generator; and
a control system electrically coupled to the signal generator and operatively engaged with the gear transmission mechanism such that when the signal generator is manually activated, an electric signal is generated and transmitted to the control system to cause the gear transmission mechanism to vary the gear reduction ratio;
wherein the signal generator comprises a switch mounted on the housing;
wherein the control system comprises:
   a control unit electrically connected to the switch to receive the electrical signal when the switch is activated; and
   a driving mechanism actuated by the control unit in response to the electrical signal to cause the gear transmission mechanism to vary the gear reduction ratio;
wherein the driving mechanism is electromagnetically actuatable and operatively engages the movable member, wherein the control unit is operative to apply electric current to the driving mechanism to drive the movable member.

3. The power tool according to claim 2, wherein the electromagnetically actuatable driving mechanism comprises:
a solenoid which includes a coil;
an iron core linearly movable through the coil; and
a push bar attached to the iron core and connected to the movable member.

4. The power tool according to claim 2, wherein the control system comprises an H-bridge circuit for varying the direction of the electric current applied to the electromagnetically actuatable drive mechanism.

5. A power tool capable of variable output speed comprising:
a housing;
a motor contained in the housing for outputting rotary power;
an output shaft;
a gear transmission mechanism disposed between the motor and the output shaft for transmission of the rotary power of the motor to the output shaft at each of a plurality of gear reduction ratios;
a signal generator; and
a control system electrically coupled to the signal generator and operatively engaged with the gear transmission mechanism such that when the signal generator is manually activated, an electric signal is generated and transmitted to the control system to cause the gear transmission mechanism to vary the gear reduction ratio;
wherein the signal generator comprises a switch mounted on the housing;
wherein the control system comprises:
   a control unit electrically connected to the switch to receive the electrical signal when the switch is activated; and
   a driving mechanism actuated by the control unit in response to the electrical signal to cause the gear transmission mechanism to vary the gear reduction ratio;
wherein the control unit is capable of determining whether there is a load applied to the power tool before actuating the driving mechanism.

6. The power tool according to claim 5, wherein the control unit pauses the motor for a first predetermined time interval if there is a load applied, and pauses the motor for a second predetermined time interval if there is no load applied, wherein the first predetermined time interval is shorter than the second predetermined time interval.

7. A power tool for varying output speed, comprising:
a housing;
a motor contained in the housing for outputting rotary power;
an output shaft;
a gear transmission mechanism disposed between the motor and the output shaft for transmission of the rotary power of the motor to the output shaft at each of a plurality of gear reduction ratios including a first gear reduction ratio and a second gear reduction ratio, the gear transmission mechanism comprising:
   at least one gear train; and
   a movable member variably engaged with the gear train, wherein the movable member is movable between a first position corresponding to the first gear reduction ratio and a second position corresponding to the second gear reduction ratio; and
a control system comprising a mechanism for driving the movable member to move from the first position to the second position and from the second position to the first position;
wherein the mechanism comprises a bi-directional keep solenoid capable of retaining the movable member at the first or the second position without electricity.

8. The power tool according to claim 7, wherein the bi-directional keep solenoid comprises a push bar connected to the movable member.

9. The power tool according to claim 8, wherein the bi-directional keep solenoid further comprises:
- a longitudinal metallic shell;
- a pair of coils arranged longitudinally in the shell;
- a permanent magnet disposed between the pair of coils; and
- an iron core linearly movable through the pair of coils, wherein the push bar is fixed to the iron core.

10. A power tool for varying output speed, comprising:
- a housing;
- a motor contained in the housing for outputting rotary power;
- an output shaft;
- a gear transmission mechanism disposed between the motor and the output shaft for transmission of the rotary power of the motor to the output shaft at each of a plurality of gear reduction ratios including a first gear reduction ratio and a second gear reduction ratio, the gear transmission mechanism comprising:
  - at least one gear train; and
  - a movable member variably engaged with the gear train, wherein the movable member is movable between a first position corresponding to the first gear reduction ratio and a second position corresponding to the second gear reduction ratio; and
- a control system comprising a mechanism for driving the movable member to move from the first position to the second position and from the second position to the first position;
- wherein the gear train is a planetary gear train which includes a plurality of planet gears, an adjacent planet carrier, and a rotationally fixed structure immovably associated with the housing;
- wherein the movable member comprises a ring gear which when located at the first position engages the planet gears and the planet carrier and when located at the second position engages the planet gears and the rotationally fixed structure.

11. A power tool for varying output speed, comprising:
- a housing;
- a motor contained in the housing for outputting rotary power;
- an output shaft;
- a gear transmission mechanism disposed between the motor and the output shaft for transmission of the rotary power of the motor to the output shaft at each of a plurality of gear reduction ratios including a first gear reduction ratio and a second gear reduction ratio, the gear transmission mechanism comprising:
  - at least one gear train; and
  - a movable member variably engaged with the gear train, wherein the movable member is movable between a first position corresponding to the first gear reduction ratio and a second position corresponding to the second gear reduction ratio; and
- a control system comprising a mechanism for driving the movable member to move from the first position to the second position and from the second position to the first position;
- wherein the control system further comprises a control unit operative to apply electric current to the mechanism to drive the movable member;
- wherein the control system comprises an H-bridge circuit for changing the direction of the electric current applied to the mechanism.

* * * * *

UNITED STATES PATENT AND TRADEMARK OFFICE
CERTIFICATE OF CORRECTION

| | | |
|---|---|---|
| PATENT NO. | : 7,882,900 B2 | Page 1 of 2 |
| APPLICATION NO. | : 12/198712 | |
| DATED | : February 8, 2011 | |
| INVENTOR(S) | : Gianni Borinato | |

It is certified that error appears in the above-identified patent and that said Letters Patent is hereby corrected as shown below:

- At Sheet 7 of 26, Figure 5, Line 5 (Approx.), Change "feed back" to --feedback--.
- At Sheet 8 of 26, Figure 6, Line 7 (Approx.), Change "feed back" to --feedback--.
- At Sheet 9 of 26, Figure 7, Line 7 (Approx.), Change "feed back" to --feedback--.
- At Sheet 10 of 26, Figure 8, Line 6 (Approx.), Change "feed back" to --feedback--.
- At Sheet 23 of 26, Box 712, Figure 21, Line 1, Change "Inifialize" to --Initialize--.
- At Sheet 23 of 26, Box 726, Figure 21, Line 1, Change "Speet" to --Speed--.
- At Column 8, Lines 44-52, After "zero." delete "The microcontroller 30 then issues an instruction signal to the driving mechanism control circuit 33 to reverse the electric current. After the current has reversed, the iron core 523 along with the movable member 45 is moved from the high speed position to the low speed position. Since the rotation of the movable member 45 has been reduced to zero before starting to move, the movable member 45 is capable of engaging the rotationally fixed structure smoothly and does not cause gear clash." and insert the same as a new paragraph on line no. 45.
- At Column 9, Line 7, Change "seconds)," to --seconds).--.
- At Column 10, Line 34, Change "IH" to --ηH--.
- At Column 10, Line 36, Change "curve 1L" to --curve ηL--.
- At Column 10, Line 38, Change "embodiment" to --embodiment,--.
- At Column 10, Line 38, Change "30 A." to --30A.--.
- At Column 13, Line 12, Change "feed back" to --feedback--.
- At Column 14, Line 8, Change "level," to --level.--.
- At Column 15, Line 39, Change "feed back" to --feedback--.
- At Column 15, Line 41, Change "R25', 26," to --R25, R26,--.
- At Column 16, Line 2, Change "feed back" to --feedback--.

Signed and Sealed this
Seventh Day of February, 2012

David J. Kappos
*Director of the United States Patent and Trademark Office*

CERTIFICATE OF CORRECTION (continued)
U.S. Pat. No. 7,882,900 B2

- At Column 16, Line 10, Change "R117." to --R17.--.
- At Column 16, Line 61, Change "90 A" to --90A--.
- At Column 16, Line 67, Change "90 A" to --90A--.
- At Column 17, Line 4, Change "30 A" to --30A--.
- At Column 17, Line 17, Change "4 5" to --45--.
- At Column 17, Line 32, Change "feed back" to --feedback--.
- At Column 17, Lines 56-57, Change "98 A" to --98A--.
- At Column 18, Line 2, Change "30 A" to --30A--.